(12) United States Patent
Kramer et al.

(10) Patent No.: US 9,221,238 B2
(45) Date of Patent: *Dec. 29, 2015

(54) APPARATUS AND METHOD FOR ASSOCIATING THE EDGE OF A COMPOSITE OBJECT WITH TRIM

(71) Applicant: The Boeing Company, Chicago, IL (US)

(72) Inventors: Scott A. Kramer, Seattle, WA (US); Nathanial C. Cuddy, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/906,632

(22) Filed: May 31, 2013

(65) Prior Publication Data

US 2014/0205368 A1 Jul. 24, 2014

Related U.S. Application Data

(63) Continuation-in-part of application No. 13/747,641, filed on Jan. 23, 2013.

(51) Int. Cl.
*B32B 37/12* (2006.01)
*B32B 5/00* (2006.01)
*F16B 5/01* (2006.01)

(52) U.S. Cl.
CPC . *B32B 37/12* (2013.01); *B32B 5/00* (2013.01); *F16B 5/01* (2013.01); *Y10T 403/472* (2015.01); *Y10T 403/64* (2015.01); *Y10T 403/70* (2015.01); *Y10T 403/7075* (2015.01)

(58) Field of Classification Search
CPC ............ B32B 37/12; B32B 5/00; F16B 5/01; Y10T 24/30; Y10T 24/304; Y10T 24/309; Y10T 403/472; Y10T 403/7075

USPC ............................................. 156/66; 403/345
See application file for complete search history.

(56) References Cited

U.S. PATENT DOCUMENTS 3,742,673 A * 7/1973 Jennings et al. ........... 52/787.12
4,916,882 A 4/1990 Brochard et al.
(Continued)

FOREIGN PATENT DOCUMENTS

DE 102005057525 B3 6/2007
EP 0359602 A1 3/1990

OTHER PUBLICATIONS

"For Honeycomb and Sandwich Panels," Alcoa Fastening Systems, copyright 1994, 74 pages, accessed Dec. 7, 2012. http://www.alcoa.com/fastening_systems/aerospace/catalog/pdf/ AFS_Delron_honeycomb_sandwich_panels_08_2011.pdf.

(Continued)

*Primary Examiner* — Philip Tucker
*Assistant Examiner* — John Blades
(74) *Attorney, Agent, or Firm* — Yee & Associates, P.C.

(57) ABSTRACT

A method and apparatus for associating an edge of a first object with a second object using an insert. In one illustrative embodiment, an apparatus comprises a structure and a number of attachment features associated with the structure. The structure is configured to be inserted within a hollow portion of the first object at an edge of the first object. The structure is further configured to span an entire thickness of the first object at the edge of the first object. The number of attachment features is configured for use in attaching the second object to the structure to attach the second object to the edge of the first object.

18 Claims, 21 Drawing Sheets

(56) References Cited

U.S. PATENT DOCUMENTS

| | | | |
|---|---|---|---|
| 5,324,146 A | | 6/1994 | Parenti et al. |
| 5,632,582 A | * | 5/1997 | Gauron .................. 411/82.1 |
| 5,713,706 A | | 2/1998 | Lozano |
| 7,195,436 B1 | * | 3/2007 | Stephen .................. 411/82.1 |
| 2009/0293421 A1 | * | 12/2009 | Erickson et al. ........... 52/787.12 |
| 2011/0296788 A1 | * | 12/2011 | Cove et al. .................. 52/704 |
| 2014/0202615 A1 | | 7/2014 | Cuddy et al. |

OTHER PUBLICATIONS

"Potted Composite Inserts," Marketing Masters, copyright 2011, 1 page, accessed Dec. 7, 2012. http://www.clipnuts.com/potted_in_inserts.html.

"Shur-Lok Design Manual Fasteners for Sandwich Structure," Shur-Lok Corporation, copyright 1996, 35 pages, accessed Dec. 7, 2012. http://www.shur-lok.com/product_dls/Design_Manual.pdf.

Cuddy, "Apparatus and Method for Associating the Edge of a Composite Object with Another Object," U.S. Appl. No. 13/747,641, filed Jan. 23, 2013, 50 pages.

International Search Report and Written Opinion, dated Apr. 28, 2014, regarding Application No. PCT/US2013/076793, 12 pages.

Office Action, dated Sep. 17, 2014, regarding U.S. Appl. No. 13/747,641, 16 pages.

Final Office Action, dated Feb. 26, 2015, regarding U.S. Appl. No. 13/747,641, 33 pages.

Notice of Allowance, dated Apr. 7, 2015, regarding U.S. Appl. No. 13/747,641, 13 pages.

* cited by examiner

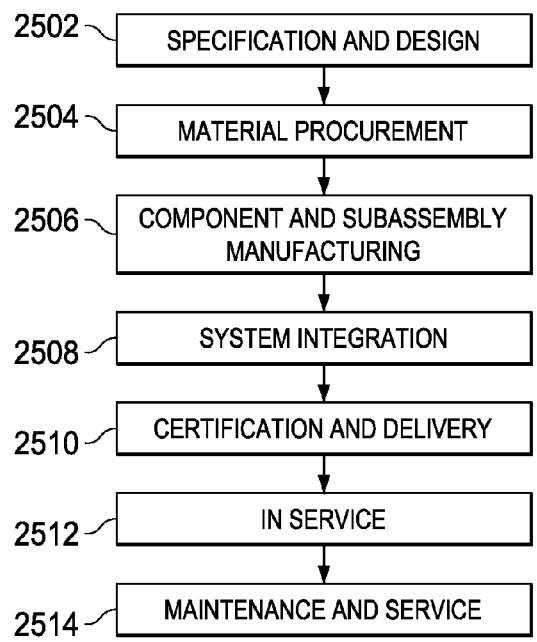
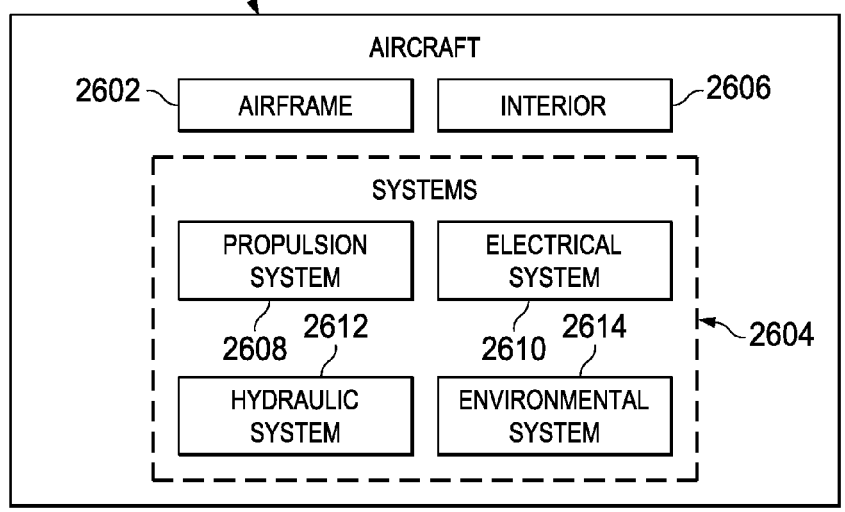

APPARATUS AND METHOD FOR ASSOCIATING THE EDGE OF A COMPOSITE OBJECT WITH TRIM

CROSS-REFERENCE TO RELATED APPLICATION

This is a continuation-in-part application of U.S. patent application Ser. No. 13/747,641, filed Jan. 23, 2013, the disclosure of which is incorporated by reference herein in its entirety.

BACKGROUND INFORMATION

1. Field

The present disclosure relates generally to associating objects with each other. More particularly, the present disclosure relates to a method and apparatus for associating the edge of an object with another object using an insert that may be adhesively bonded to the object at the edge of the object.

2. Background

A composite object may be considered a sandwiched composite object when the composite object is comprised of a core layer of material that is sandwiched between a first layer of material and a second layer of material. The core layer of material may have a greater thickness than the first and second layers of material. In some cases, the core layer of material may be comprised of a honeycomb material, a foam material, or some other structure. A honeycomb material may be a material that has a honeycomb-like structure.

Oftentimes, all three of these layers may be exposed at the edge of a composite object. Attaching another object to the composite object at the edge of the composite object may require using one or more fastener components that have been installed at the edge of the composite object.

As one illustrative example, a bracket may be installed at the edge of the composite object. The bracket may surround a portion of the edge of the composite object and cover a portion of the outer surface of the first layer of material and a portion of the outer surface of the second layer of material. Consequently, in some cases, a bracket may change the shape of the outer surfaces of the composite object in an undesired manner. For example, without limitation, a bracket may change the evenness of these outer surfaces.

In another illustrative example, a fastener may be installed at the edge of the composite object using a cylindrical insert. For example, without limitation, a hole may be formed within the core layer of material at the edge of the composite object. The cylindrical insert may then be placed within this hole in the core layer of material. The fastener may then be installed within the cylindrical insert.

However, in some cases, the hole formed within the core layer of material may be rougher than desired. For example, without limitation, the edges of the hole may be uneven and rougher than desired. As a result, the cylindrical insert may not align with the hole in the core layer of material within selected tolerances. This type of misalignment may require additional processing of the hole, which may in turn, increase the overall time and/or effort needed to install the fastener. Further, in some cases, the cylindrical insert may increase the overall weight of the composite object more than desired.

Additionally, forming a hole within the core layer of material may have an undesirable effect on the structural integrity of the core layer of material. For example, without limitation, forming a hole within a honeycomb material may reduce the structural strength of the honeycomb material.

In certain situations, one or more pieces of trim may need to be attached to one or more edges of a composite object. For example, a piece of trim may be attached to an edge of a composite object to cover the exposed honeycomb material at the edge. Further, the trim may be used to protect the edge of the composite object. The trim may function as, for example, a bumper that may protect the edge of the composite object from coming into contact with other surfaces. The trim may need to be easily replaceable in the event the trim is affected in an undesired manner. Consequently, bonding the trim to the edge of the composite object may not be desirable.

Rather, a retainer may be bonded to the edge of the composite object and used to removably attach the trim to the edge. However, bonding the retainer to the edge of the composite object may be more time-consuming and require more effort than desired. Therefore, it would be desirable to have a method and apparatus that take into account at least some of the issues discussed above, as well as other possible issues.

SUMMARY

In one illustrative embodiment, an apparatus comprises a structure and a number of attachment features associated with the structure. The structure is configured to be inserted within a hollow portion of a first object at an edge of the first object. The structure is further configured to span an entire thickness of the first object at the edge of the first object. The number of attachment features is configured for use in attaching a second object to the structure to attach the second object to the edge of the first object.

In another illustrative embodiment, an insert is configured for use at an edge of a composite object. The insert comprises a structure and a number of attachment features associated with the structure. The structure is configured to be inserted within a hollow portion of the composite object at the edge of the composite object. The structure is further configured to be adhesively bonded to the composite object. The structure is configured to span an entire thickness of the composite object at the edge of the composite object. The number of attachment features is configured for use in attaching a trim member to the structure to attach the trim member to the edge of the composite object.

In yet another illustrative embodiment, a method for associating an edge of a first object with a second object is provided. An insert comprising a structure is positioned within a hollow portion of the first object at the edge of the first object. The structure is configured to span an entire thickness of the first object at the edge of the first object. The structure is adhesively bonded to the first object. The second object is attached to the structure using a number of attachment features associated with the structure to attach the second object to the edge of the object.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 25 is an illustration of an aircraft manufacturing and service method in the form of a block diagram in accordance with an illustrative embodiment; and FIG. 26 is an illustration of an aircraft in the form of a block diagram in accordance with an illustrative embodiment.

DETAILED DESCRIPTION

The different illustrative embodiments recognize and take into account different considerations. In particular, the illustrative embodiments recognize and take into account that it may be desirable to have an insert that may be installed at the edge of a composite object without reducing the structural integrity of the composite object more than desired. Further, the illustrative embodiments recognize and take into account that it may be desirable to have an insert that may be installed at the edge of a composite object without taking more time and/or effort than desired.

Thus, the illustrative embodiments provide a method and apparatus for associating an edge of a first object with a second object. In one illustrative embodiment, a method and apparatus for associating an edge of a first object with a second object may be provided. An insert comprising a structure holding a fastener element may be positioned within a hollow portion at the edge of the first object. The structure may be configured to span an entire thickness of the first object at the edge of the first object. The structure may be adhesively bonded to the first object. The second object may be attached to the edge of the first object using the fastener element.

Figure 1:
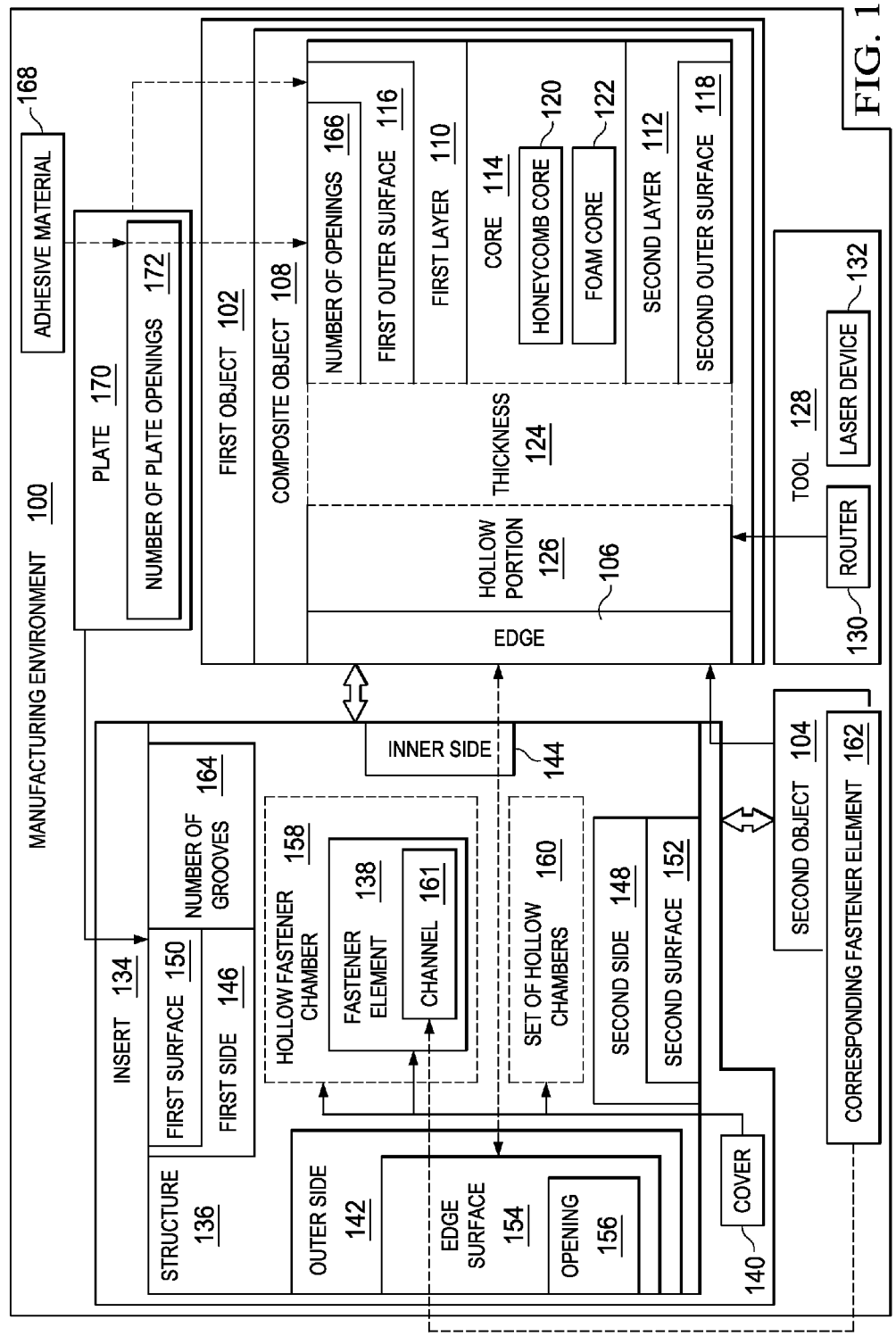
FIG. 1 is an illustration of a manufacturing environment in the form of a block diagram in accordance with an illustrative embodiment.

Referring now to the figures and, in particular, with reference now to FIG. 1, an illustration of a manufacturing environment in the form of a block diagram is depicted in accordance with an illustrative embodiment. In FIG. 1, manufacturing environment 100 may be an example of an environment in which structures may be associated with each other. In these illustrative examples, first object 102 and second object 104 may be configured for association with each other within manufacturing environment 100.

As used herein, when one component is "associated" with another component, the association is a physical association in the depicted examples. For example, a first component, such as second object 104, may be considered to be associated with a second component, such as first object 102, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In these illustrative examples, first object 102 may take the form of composite object 108. In particular, first object 102 may be comprised of first layer 110, second layer 112, and core 114. In these illustrative examples, core 114 may be located in between first layer 110 and second layer 112. In other words, core 114 may be "sandwiched" between first layer 110 and second layer 112. In this manner, first object 102 may be referred to as a "sandwiched composite object" or a "sandwiched-structure composite."

The surface of first layer 110 not in contact with core 114 may form first outer surface 116 of first object 102. Further, the surface of second layer 112 not in contact with core 114 may form second outer surface 118 of first object 102.

First layer 110 and second layer 112 of first object 102 may be comprised of any number of different materials. These materials may include, for example, without limitation, a composite material, metal, plastic, and/or other suitable types of materials. In some cases, these layers may be comprised of one or more composite materials including, but not limited to, glass-reinforced plastic, carbon fiber-reinforced plastic (CFRP), thermoplastic, a thermoset polymer, a composite polymer, and/or other types of composite materials.

In one illustrative example, first layer 110 and second layer 112 may take the form of pre-impregnated composite fiber panels, also referred to as prepreg panels or prepregs. In some cases, first layer 110 and second layer 112 may be referred to as face sheets or skins.

Depending on the implementation, core 114 may take the form of honeycomb core 120 or foam core 122. Honeycomb core 120 may be a layer of material comprising an array of hollow cells defined by walls. These cells may have, for example, without limitation, a cylindrical shape, a cuboidal shape, a prism-type shape, a hexagonal shape, or some other type of shape. Foam core 122 may be, for example, without limitation, a layer of material comprised of, for example, without limitation, an open-cell foam material, a closed-cell foam material, or some other type of foam material.

Of course, in other illustrative examples, core 114 may take a different form. For example, without limitation, core 114 may take the form of a lattice structure, an arrangement of rods, and/or other types of elongate members, a mesh structure, or some other type of structure.

Further, core 114 of first object 102 may be comprised of any number of different materials. In particular, core 114 may be a light-weight structure comprised of any selection of materials configured to allow core 114 to hold first layer 110 and second layer 112 a fixed distance apart during locating. The selection of materials may include, for example, without limitation, polyurethane, aluminum, glass-reinforced plastic such as fiberglass, carbon fiber-reinforced plastic, a thermoplastic material, an aramid fiber material, a meta-aramid material, a foam material, and/or other types of materials.

Second object 104 may take a number of different forms. Second object 104 may be any type of object that is configured for association with edge 106 of first object 102. For example, without limitation, second object 104 may take the form of a trim, an edge-mount step, a handhold, a quarter turn object, a hinge, a wire tie, a bracket, a trim material, or some other type of object configured to be attached to edge 106 of first object 102.

As depicted, edge 106 of first object 102 may span the entire thickness 124 of first object 102. When first object 102 takes the form of composite object 108, edge 106 may be any edge at which each of first layer 110, second layer 112, and core 114 are exposed. In particular, edge 106 may span the entire thickness 124 that includes the thicknesses of each of first layer 110, second layer 112, and core 114 that may be exposed.

Further, edge 106 of first object 102 may be substantially perpendicular to first outer surface 116 of first object 102 and substantially perpendicular to second outer surface 118 of first object 102 in these illustrative examples. Of course, in some cases, edge 106 may be at some other angle relative to first outer surface 116 and/or second outer surface 118. However, in these illustrative examples, edge 106 may not be substantially parallel to first outer surface 116 or second outer surface 118.

Second object 104 may be associated with first object 102 using insert 134. Insert 134 may be configured to be positioned within hollow portion 126 of first object 102 at edge 106. In these illustrative examples, hollow portion 126 may be formed within first object 102 at edge 106 of first object 102 using tool 128. In particular, tool 128 may be used to remove a portion of first object 102 to form hollow portion 126. Hollow portion 126 may be formed such that hollow portion 126 spans the entire thickness 124 of first object 102 at edge 106 of first object 102. In other words, the portion removed from first object 102 may include portions of first layer 110, core 114, and second layer 112.

Tool 128 may take the form of, for example, without limitation, router 130, laser device 132, or some other type of cutting tool. Using, for example, without limitation, router 130 to cut away a portion of first object 102 to form hollow portion 126 may be easier and require less effort than forming a hole within core 114 alone.

Hollow portion 126 may be formed such that insert 134 may be substantially entirely inserted within hollow portion 126. Insert 134 may then be used to attach second object 104 to first object 102 at edge 106. As depicted, insert 134 may include structure 136, fastener element 138, and cover 140. When insert 134 is positioned with hollow portion 126 of first object 102, fastener element 138 may be exposed at edge 106 and prepared to receive another fastener element.

In these illustrative examples, structure 136 may have outer side 142, inner side 144, first side 146, and second side 148. In particular, structure 136 may have first surface 150 and second surface 152 at first side 146 and second side 148, respectively. Structure 136 may also have edge surface 154 at outer side 142. Edge surface 154 at outer side 142 of structure 136 may be the surface of structure 136 that is exposed at edge 106 of first object 102 when structure 136 is inserted within hollow portion 126.

As depicted, edge surface 154 may have opening 156 that extends through structure 136. Opening 156 may only be located along edge surface 154 in these examples. In other words, opening 156 may not be located along first surface 150 or second surface 152 of structure 136.

Edge surface 154 of structure 136 may be configured to be substantially even with edge 106 of first object 102 when structure 136 is inserted within hollow portion 126. Further, first surface 150 and second surface 152 of structure 136 may be configured to be substantially even with first outer surface 116 and second outer surface 118, respectively, of first object 102 when structure 136 is inserted within hollow portion 126.

In other words, edge surface 154, first surface 150, and second surface 152 may be substantially flush with edge 106 of first object 102 when structure 136 is inserted within hollow portion 126. In these illustrative examples, structure 136 may be shaped such that structure 136, and thereby insert 134, are substantially flush with all portions of first object 102 when insert 134 is positioned within hollow portion 126 of first object 102.

In these illustrative examples, structure 136 may be configured to hold fastener element 138. Fastener element 138 may take any number of forms depending on the implementation. In one illustrative example, fastener element 138 may take the form of a nut having threads configured to receive another threaded fastener element, such as a screw.

As depicted, hollow fastener chamber 158 of structure 136 may be configured to receive and hold fastener element 138. In one illustrative example, hollow fastener chamber 158 may have a first size that is greater than a second size of fastener element 138. As one illustrative example, hollow fastener chamber 158 may have a greater diameter than the diameter of fastener element 138. In this manner, fastener element 138 may be configured to move freely within hollow fastener chamber 158 of structure 136. In one illustrative example, fastener element 138 may be configured to move freely within a plane substantially perpendicular to an axis through fastener element 138. In other words, fastener element 138 may be allowed to "float" within hollow fastener chamber 158.

Additionally, structure 136 may have set of hollow chambers 160. As used herein, a "set of" items may be zero or more items. In this manner, a set of items may be a null or empty set in some cases. In these illustrative examples, set of hollow chambers 160 may include zero, two, four, or some other number of hollow chambers. Set of hollow chambers 160 may be configured to reduce the weight of structure 136.

Once insert 134 has been positioned within hollow portion 126, insert 134 may be adhesively bonded to first object 102. As one illustrative example, structure 136 may have number of grooves 164 at first side 146 of structure 136. When structure 136 is inserted within hollow portion 126 of first object 102, number of grooves 164 may form number of openings 166 at first side 146 of structure 136.

As used herein, a "number of" items may be one or more items. In this manner, number of grooves 164 may include one or more grooves and number of openings 166 may include one or more openings.

Number of openings 166 may open into air pockets that may be around and/or within hollow portion 126 within core 114 around structure 136. Adhesive material 168 may be injected into these air pockets through number of openings 166. Adhesive material 168 may take the form of, for example, without limitation, a potting compound.

In one illustrative example, plate 170 may be positioned such that plate 170 covers at least a portion of first surface 150 of structure 136 and at least a portion of first outer surface 116 of first object 102. In particular, plate 170 may have number of plate openings 172 that correspond to number of openings 166. Plate 170 may be positioned such that number of plate openings 172 may be substantially aligned with number of openings 166.

When adhesive material 168 is injected into number of openings 166, any excess of adhesive material 168 that spills over onto plate 170 without contacting first surface 150 of structure 136 or first outer surface 116 of first object 102. In other words, plate 170 may catch overflow of adhesive material 168 to prevent adhesive material 168 from contacting first outer surface 116 of first object 102.

Plate 170 may be removed and adhesive material 168 may be allowed to harden such that insert 134 is adhesively bonded to first object 102. Once insert 134 is adhesively bonded to first object 102, loads may be transferred between insert 134 and first layer 110 and second layer 112 through adhesive material 168.

In these illustrative examples, fastener element 138 may have channel 161 that extends through fastener element 138. When fastener element 138 is positioned within hollow fastener chamber 158 of structure 136, channel 161 may extend through at least a portion of opening 156 in structure 136. Opening 156 allows channel 161 through fastener element 138 to be exposed at edge 106 of first object 102. In this manner, fastener element 138 may be prepared to receive corresponding fastener element 162 into channel 161 of fastener element 138 through opening 156 in structure 136.

Corresponding fastener element 162 may be another fastener element that is configured for association with second object 104. In one illustrative example, corresponding fastener element 162 may be a screw. Corresponding fastener element 162 may be inserted through opening 156 into channel 161 at edge 106 in a direction that is substantially perpendicular to edge 106. In some cases, corresponding fastener element 162 may be inserted at edge 106 at some other angle relative to edge 106.

When corresponding fastener element 162 is inserted through opening 156 at edge surface 154 of structure 136, at least a portion of corresponding fastener element 162 enters channel 161 of fastener element 138. Insertion of corresponding fastener element 162 into channel 161 may cause fastener element 138 to move freely within hollow fastener chamber 158 of structure 136. In particular, fastener element 138 may move such that channel 161 through fastener element 138 may substantially align with corresponding fastener element 162 within selected tolerances. In this manner, corresponding fastener element 162 may be used to attach second object 104 to first object 102 at edge 106 of structure.

The illustration of manufacturing environment 100 and insert 134 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although insert 134 is depicted with structure 136 holding one fastener element, fastener element 138, structure 136 may be configured to hold more than one fastener element within one or more respective hollow fastener chambers. For example, without limitation, insert 134 may be configured to hold two different types of fastener elements within two different hollow fastener chambers.

Further, although insert 134 is depicted as spanning the entire thickness 124 of first object 102, insert 134 may be configured to span the entire of thickness of two objects that have been stacked on top of each other to form a common edge. For example, without limitation, first object 102 and another object (not shown) may be stacked on top of each other to form a common edge that includes edge 106 and a corresponding edge (not shown) of the other object. Insert 134 may be configured to span the entire thickness of this common edge. In some cases, with this type of configuration, insert 134 may be configured to hold multiple fastener elements that may be installed into these structures. Of course, in some illustrative examples, first object 102 may be comprised of multiple objects; thickness 124 of first object 102 may include the thicknesses of these multiple objects; and edge 106 may be the common edge formed by these multiple objects.

In other illustrative examples, fastener element 138 may not be allowed to move freely within hollow fastener chamber 158. Rather, fastener element 138 and hollow fastener chamber 158 may be sized such that an interference fit is formed when fastener element 138 is placed within hollow fastener chamber 158.

Figure 2:
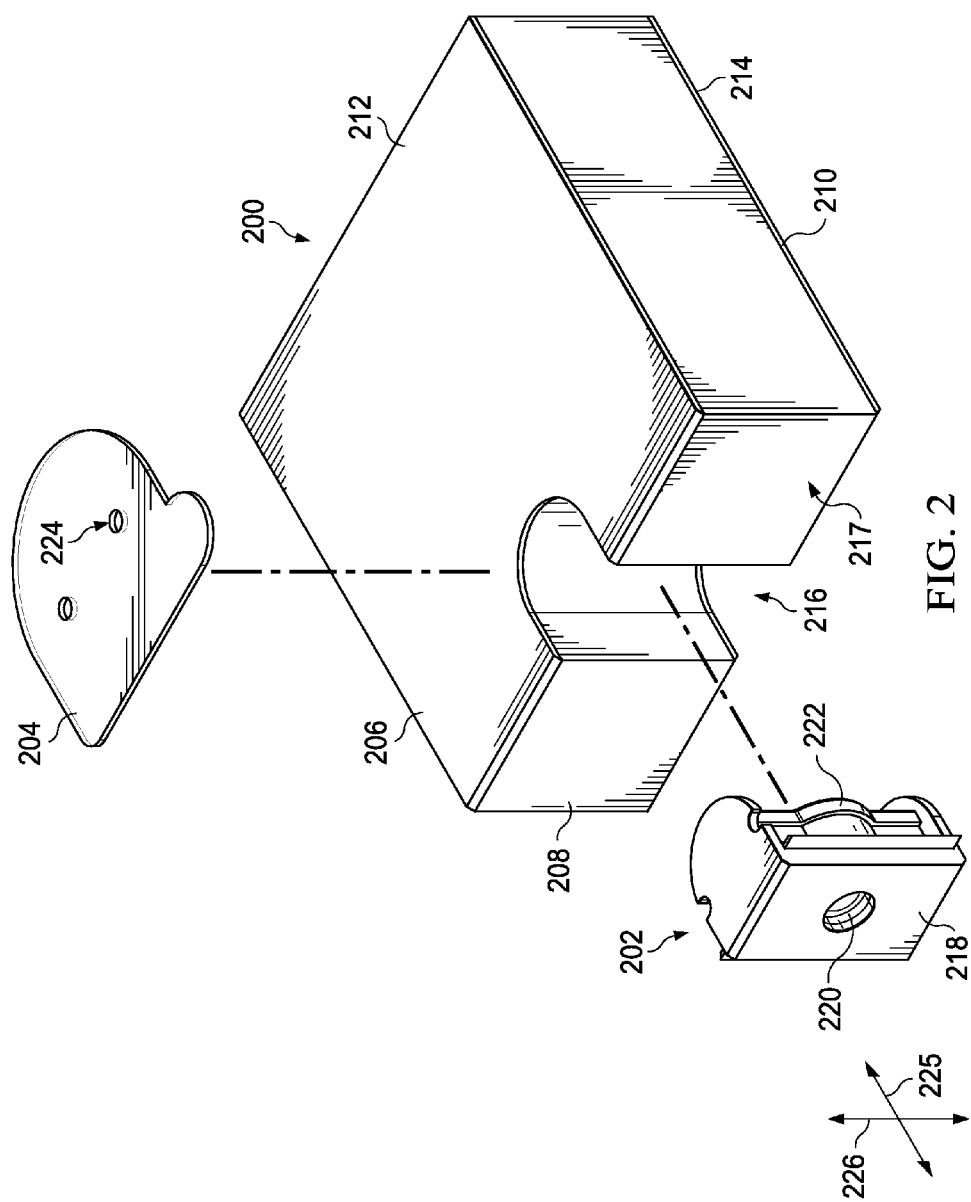
FIG. 2 is an illustration of an isometric view of a composite object, insert, and plate in accordance with an illustrative embodiment.

With reference now to FIG. 2, an illustration of an isometric view of a composite object, insert, and plate is depicted in accordance with an illustrative embodiment. In FIG. 2, composite object 200, insert 202, and plate 204 may be examples of implementations for composite object 108, insert 134, and plate 170, respectively, in FIG. 1.

In this illustrative example, composite object 200 may be comprised of first layer 206, core 208, and second layer 210, which may be examples of implementations for first layer 110, core 114, and second layer 112, respectively, in FIG. 1. As depicted, core 208 is sandwiched between first layer 206 and second layer 210. First layer 206 may form first outer surface 212 of composite object 200, while second layer 210 may form second outer surface 214 of composite object 200. First outer surface 212 and second outer surface 214 may be examples of implementations for first outer surface 116 and second outer surface 118, respectively, in FIG. 1.

Hollow portion 216 may be present within composite object 200 at edge 217 of composite object 200. Hollow portion 216 may be an example of one implementation for hollow portion 126 in FIG. 1. Further, edge 217 may be an example of one implementation for edge 106 in FIG. 1.

In this illustrative example, hollow portion 216 may have been formed using, for example, without limitation, a router (not shown). Insert 202 may be configured to be positioned within hollow portion 216. In particular, insert 202 may be configured such that insert 202 may substantially conform to hollow portion 216.

As depicted, insert 202 may include structure 218, fastener element 220, and cover 222. Structure 218, fastener element 220, and cover 222 may be examples of implementations for structure 136, fastener element 138, and cover 140, respectively, in FIG. 1.

Insert 202 may be positioned within hollow portion 216 and adhesively bonded to composite object 200. In particular, insert 202 may be adhesively bonded to composite object 200 using plate 204 having number of openings 224. Number of openings 224 may be an example of one implementation for number of plate openings 172 in FIG. 1. The process by which insert 202 may be adhesively bonded to composite object 200 is described in FIGS. 7-9.

A second composite object (not shown) may be attached to composite object 200 using insert 202 and a corresponding fastener element (not shown). In particular, the second composite object (not shown) may be attached to edge 217 of composite object 200 by inserting the corresponding fastener element (not shown) into fastener element 220 in a direction substantially parallel to axis 225. Axis 225 is the center axis through fastener element 220 in this example.

In this illustrative example, axis 225 is substantially perpendicular to edge 217 and substantially parallel to first outer surface 212 and second outer surface 214. Axis 226 is substantially perpendicular to axis 225 and to first outer surface 212 and second outer surface 214. In this illustrative example, axis 226 is substantially parallel to edge 217.

Figure 3:
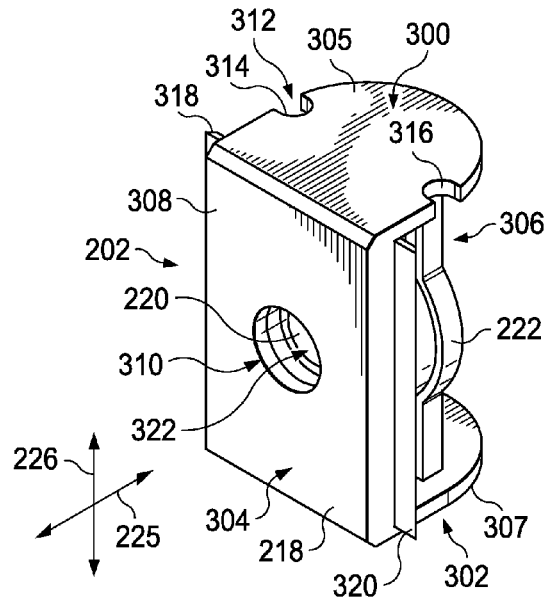
FIG. 3 is an illustration of an enlarged view of an insert in accordance with an illustrative embodiment.

Turning now to FIG. 3, an illustration of an enlarged view of insert 202 from FIG. 2 is depicted in accordance with an illustrative embodiment. As depicted, structure 218 belonging to insert 202 may have first side 300, second side 302, outer side 304, and inner side 306. In particular, structure 218 may have first surface 305 at first side 300, second surface 307 at second side 302, and edge surface 308 at outer side 304. In this illustrative example, opening 310 may be present in edge surface 308 at outer side 304 of structure 218.

Axis 225 through fastener element 220 may be substantially perpendicular to edge surface 308 in this illustrative example. However, in some cases, fastener element 220 may be positioned such that axis 225 through fastener element 220 is at some other angle relative to edge surface 308.

As depicted, structure 218 may have number of grooves 312 at first side 300. Number of grooves 312 may be an example of one implementation for number of grooves 164 in FIG. 1. Number of grooves 312 may include groove 314 and groove 316.

Additionally, in this illustrative example, structure 218 may also include a number of flanges that include flange 318 and flange 320. In some cases, these flanges may also be referred to as tabs. Flange 318 and flange 320 may be flexible at the interface between each of these flanges and structure 218. In other words, flange 318 and flange 320 may be rotated relative to structure 218 at the corresponding interfaces between flange 318 and flange 320.

Flange 318 and flange 320 may be configured to hold the adhesive material used to bond insert 202 to composite object 200 in FIG. 2 within hollow portion 216. In particular, flange 318 and flange 320 may be configured to reduce the flow of adhesive material at outer side 304 of structure 218 such that the adhesive material does not squeeze outside of and around insert 202.

As depicted, fastener element 220 may have channel 322 that extends through fastener element 220. Opening 310 in structure 218 may at least partially overlap with channel 322 in this illustrative example.

Figure 4:
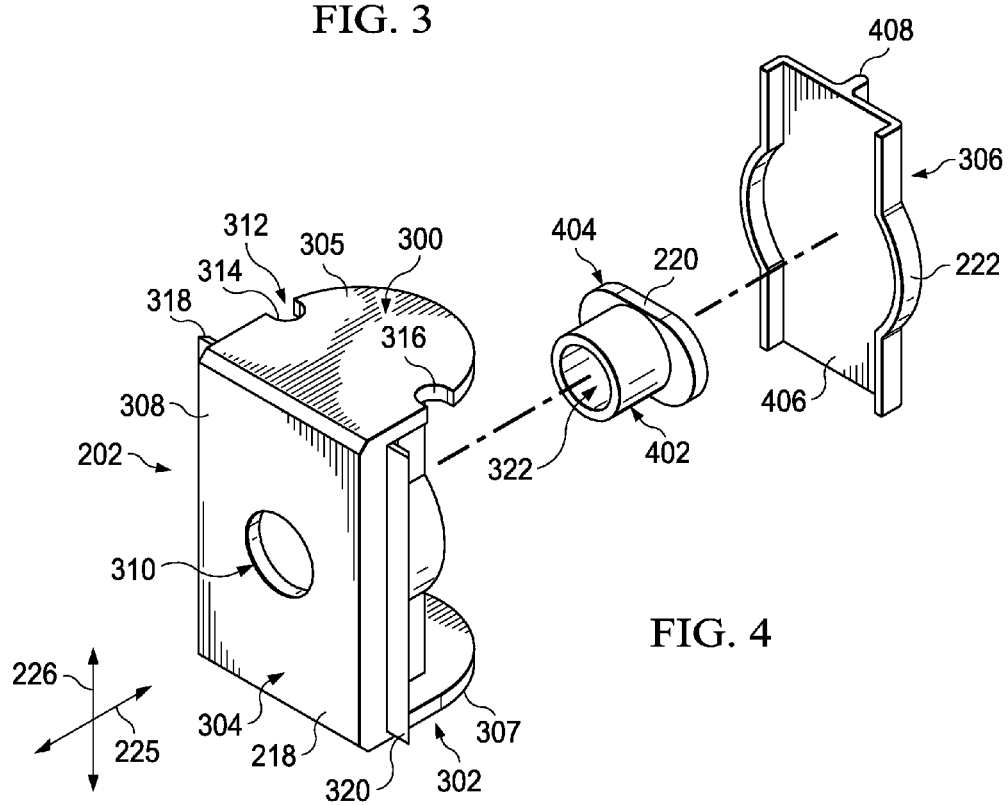
FIG. 4 is an illustration of an exploded isometric view of an insert in accordance with an illustrative embodiment.

With reference now to FIG. 4, an illustration of an exploded isometric view of insert 202 from FIG. 3 is depicted in accordance with an illustrative embodiment. In this illustrative example, fastener element 220 and cover 222 may be more clearly seen. As depicted, fastener element 220 may be comprised of first portion 402 and second portion 404. Channel 322 may extend through both first portion 402 and second portion 404.

Cover 222 may have surface 406 configured to cover fastener element 220. Surface 406 may be substantially planar in this illustrative example. Additionally, cover 222 may have protrusion 408. Protrusion 408 may be configured to protrude into core 208 of composite object 200 from FIG. 2 when insert 202 may be positioned within hollow portion 216 of composite object 200 in FIG. 2.

Figure 5:
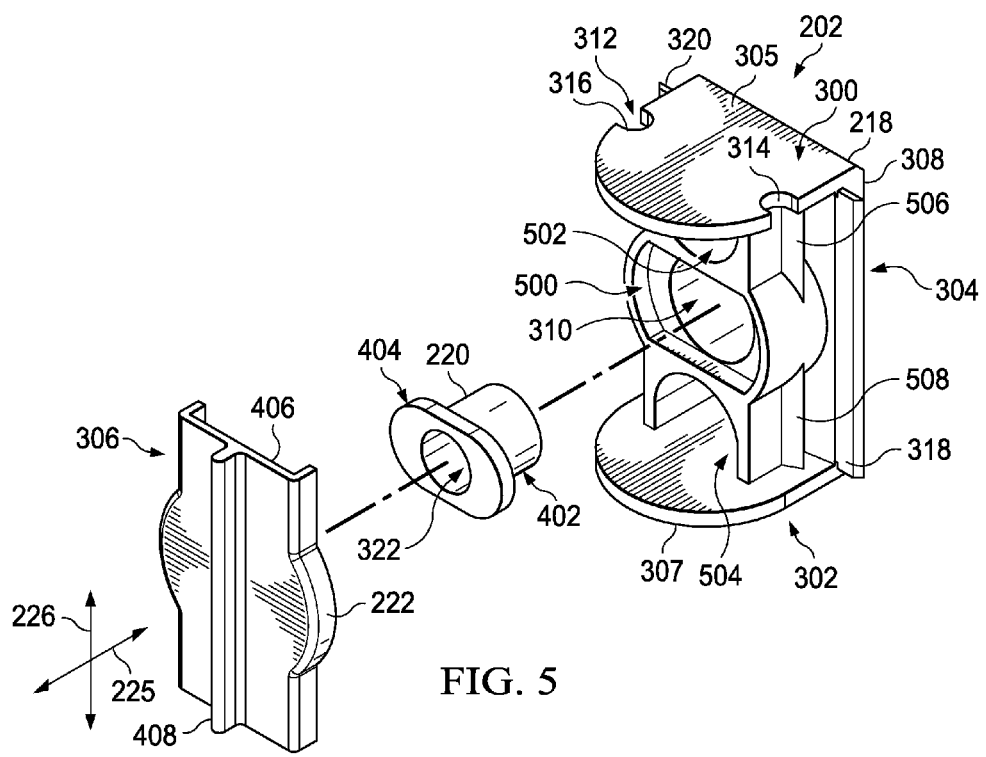
FIG. 5 is an illustration of an exploded isometric view of the insert rotated 180 degrees in accordance with an illustrative embodiment.

With reference now to FIG. 5, an illustration of the exploded isometric view of insert 202 from FIG. 4 rotated about 180 degrees about axis 226 is depicted in accordance with an illustrative embodiment. As depicted in FIG. 5, structure 218 may have hollow fastener chamber 500, hollow chamber 502, and hollow chamber 504. Hollow fastener chamber 500 may be an example of one implementation for hollow fastener chamber 158 in FIG. 1. Hollow fastener chamber 500 may be configured to receive and hold fastener element 220.

Further, hollow chamber 502 and hollow chamber 504 may be examples of implementations for hollow chambers that may be included in set of hollow chambers 160 in FIG. 1. Hollow chamber 502 and hollow chamber 504 may be configured to reduce the weight of structure 218.

Cover 222 may be configured to cover hollow fastener chamber 500, fastener element 220 held within hollow fastener chamber 500, hollow chamber 502, and hollow chamber 504. In this manner, any adhesive material injected into hollow portion 216 in FIG. 2 when insert 202 is positioned within hollow portion 216 may not enter hollow fastener chamber 500, hollow chamber 502, and hollow chamber 504.

Further, structure 218 may have structural feature 506 and structural feature 508. These structural features may aid structure 218 in adhering to composite object 200 within hollow portion 216.

Figure 6:
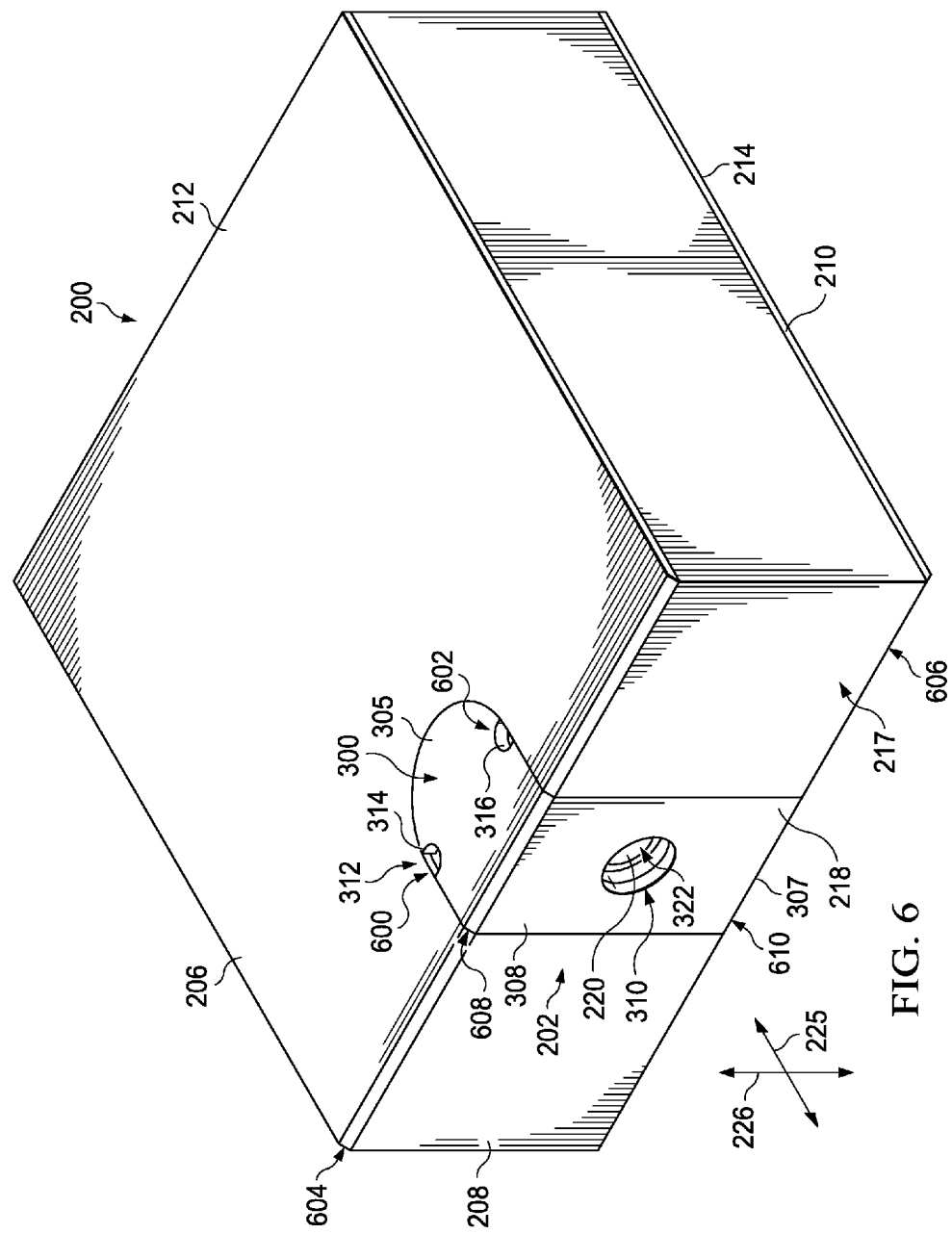
FIG. 6 is an illustration of an insert positioned within a hollow portion in accordance with an illustrative embodiment.

Turning now to FIG. 6, an illustration of insert 202 from FIGS. 2-5 positioned within hollow portion 216 from FIG. 2 is depicted in accordance with an illustrative embodiment. In this illustrative example, insert 202 may have been inserted into hollow portion 216 such that structure 218 substantially conforms to hollow portion 216.

Further, insert 202 may be inserted within hollow portion 216 such that edge surface 308 of structure 218 is substantially even with edge 219 of composite object 200. Additionally, insert 202 may be inserted within hollow portion 216 from FIG. 2 such that first surface 305 and second surface 307 of structure 218 are substantially even with first outer surface 212 and second outer surface 214, respectively, of composite object 200.

As depicted, groove 314 and groove 316 may form opening 600 and opening 602, respectively, into composite object 200 when insert 202 is positioned within hollow portion 216. Opening 600 and opening 602 may extend into core 208 of composite object 200 and, in particular, may extend into any remaining hollow portion of composite object 200 left by hollow portion 216 after insert 202 is inserted within hollow portion 216.

In this illustrative example, edge 217 may have chamfered corner 604 between core 208 and first layer 206 and chamfered corner 606 between core 208 and second layer 210. Structure 218 may have chamfered corner 608 and chamfered corner 610 configured to correspond to chamfered corner 604 and chamfered corner 606, respectively. Chamfered corner 608 and chamfered corner 610 of structure 218 may be configured such that any material such as, for example, without limitation, a trim material, that is wrapped around edge 217 of composite object 200 over a portion of first outer surface 212 and/or second outer surface 214 may lie substantially flush with these outer surfaces.

Figure 7:
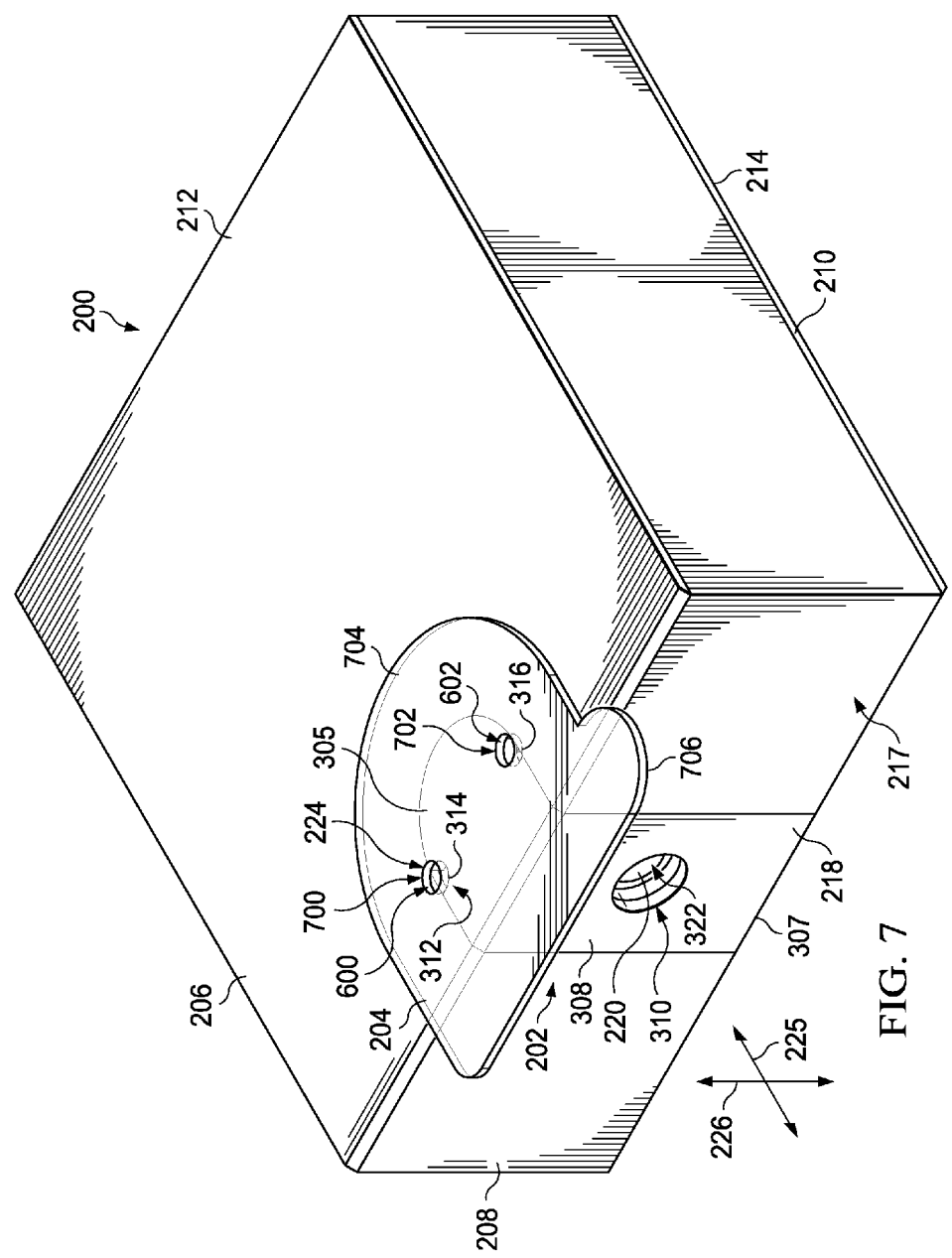
FIG. 7 is an illustration of a plate positioned over an insert and a composite object in accordance with an illustrative embodiment.

With reference now to FIG. 7, an illustration of plate 204 from FIG. 2 positioned over insert 202 and composite object 200 from FIG. 6 is depicted in accordance with an illustrative embodiment. In this illustrative example, number of openings 224 in plate 204 may be an example of one implementation for number of plate openings 172 in FIG. 1.

Number of openings 224 may include opening 700 and opening 702. Opening 700 and opening 702 may correspond to opening 600 and opening 602, respectively, into composite object 200. Plate 204 may be positioned over composite object 200 such that plate 204 overlaps both first surface 305 of structure 218 of insert 202 and first outer surface 212 of composite object 200.

Further, plate 204 may have first surface 704 and second surface 706. Both first surface 704 and second surface 706 may be substantially planar. In this manner, plate 204 may lie substantially flat on top of composite object 200.

Figure 8:
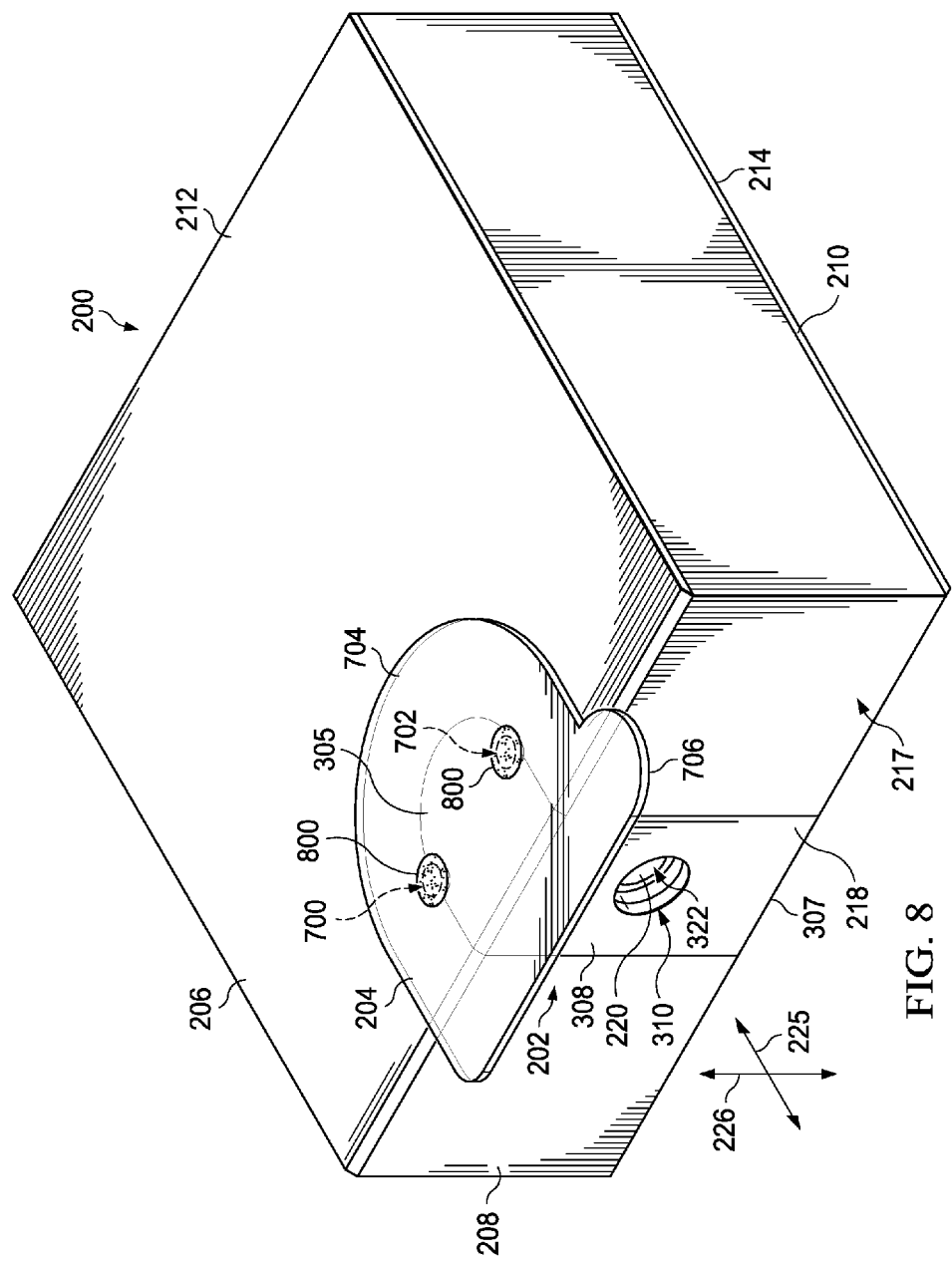
FIG. 8 is an illustration of adhesive material that has been injected into a composite object in accordance with an illustrative embodiment.

Turning now to FIG. 8, an illustration of adhesive material that has been injected into composite object 200 is depicted in accordance with an illustrative embodiment. In this illustrative example, adhesive material 800 may be injected into opening 600 and opening 602 (not shown in this view) into composite object 200 through at least one of opening 700 and opening 702, respectively, in plate 204.

In one illustrative example, adhesive material 800 may be injected into opening 700 until adhesive material 800 squeezes out of opening 702. Flange 318 and flange 320 (not shown in this view) from FIG. 3 may be used to prevent adhesive material 800 from escaping hollow portion 216 at edge 217 of composite object 200 before adhesive material 800 squeezes out of opening 702.

As depicted, any excess of adhesive material 800 may spill over onto plate 204 without contacting first outer surface 212 of composite object 200 or first surface 305 of structure 218. In this manner, plate 204 may protect first outer surface 212 of composite object 200 and first surface 305 of structure 218 and reduce the amount of cleanup needed after insert 202 is bonded to composite object 200.

Figure 9:
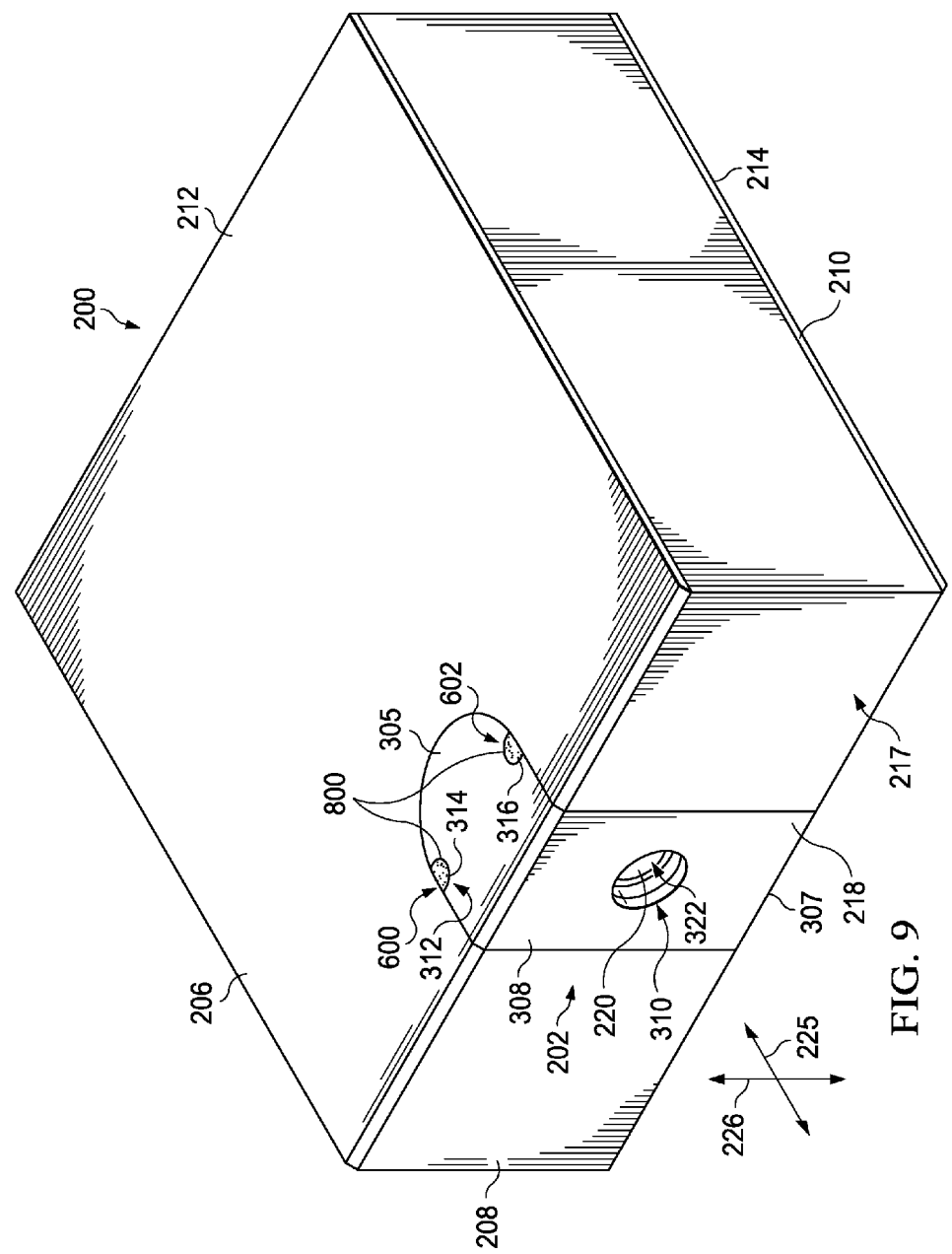
FIG. 9 is an illustration of an insert fully adhesively bonded to a composite object in accordance with an illustrative embodiment.

With reference now to FIG. 9, an illustration of insert 202 fully adhesively bonded to composite object 200 is depicted in accordance with an illustrative embodiment. In this illustrative example, plate 204 has been removed and adhesive material 800 has been allowed to harden.

Once adhesive material 800 hardens, insert 202 may be considered fully adhesively bonded to composite object 200. Another fastener element (not shown), configured for association with another structure (not shown) may be attached to composite object 200 at edge 217 of composite object 200 using insert 202 and, in particular, fastener element 220 held within structure 218 of insert 202.

Figure 10:
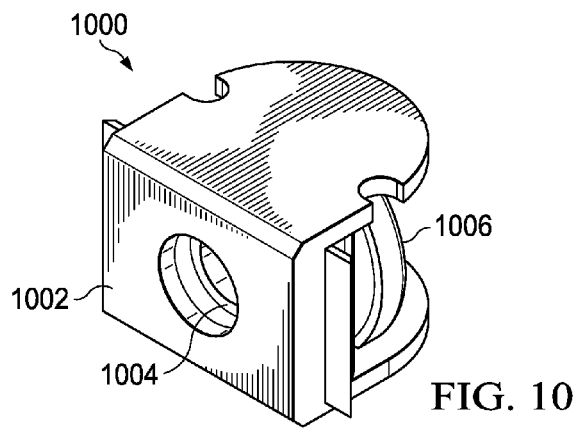
FIG. 10 is an illustration of an isometric view of a different configuration for an insert in accordance with an illustrative embodiment.

Turning now to FIG. 10, an illustration of an isometric view of a different configuration for an insert is depicted in accordance with an illustrative embodiment. In this illustrative example, insert 1000 may be an example of one implementation for insert 134 in FIG. 1. As depicted, insert 1000 may include structure 1002, fastener element 1004, and cover 1006.

Figure 11:
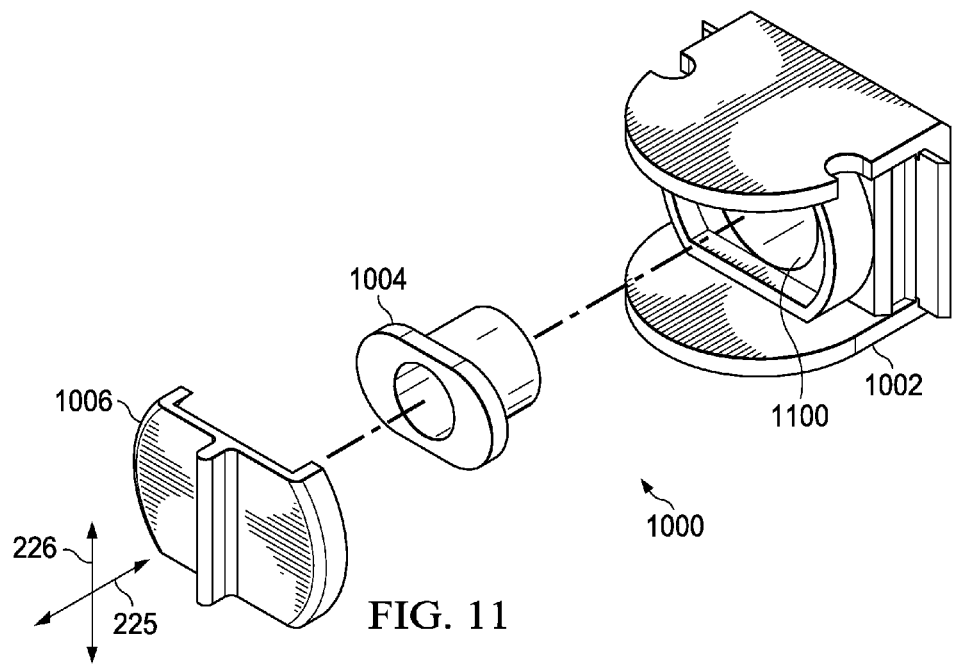
FIG. 11 is an illustration of an exploded isometric view of an insert rotated 180 degrees in accordance with an illustrative embodiment.

With reference now to FIG. 11, an illustration of an exploded isometric view of insert 1000 from FIG. 10 rotated about 180 degrees about axis 226, is depicted in accordance with an illustrative embodiment. As depicted, structure 1002 may have hollow fastener chamber 1100. However, no other hollow chambers may be present within structure 1002 in this illustrative example.

Figure 12:
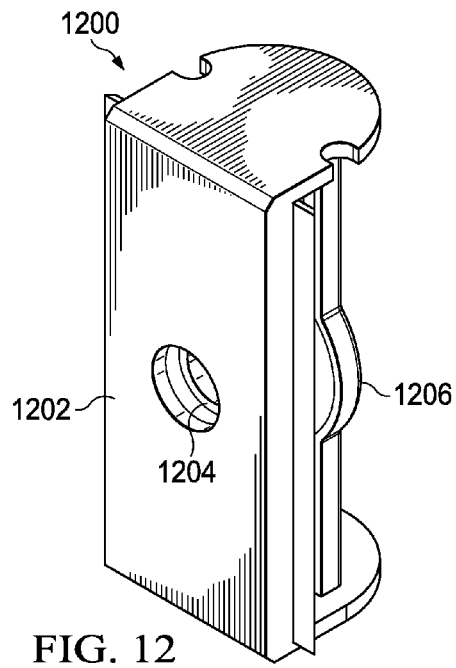
FIG. 12 is an illustration of an isometric view of a different configuration for an insert in accordance with an illustrative embodiment.

Turning now to FIG. 12, an illustration of an isometric view of a different configuration for an insert is depicted in accordance with an illustrative embodiment. In this illustrative example, insert 1200 may be an example of one implementation for insert 134 in FIG. 1. As depicted, insert 1200 may include structure 1202, fastener element 1204, and cover 1206.

Figure 13:
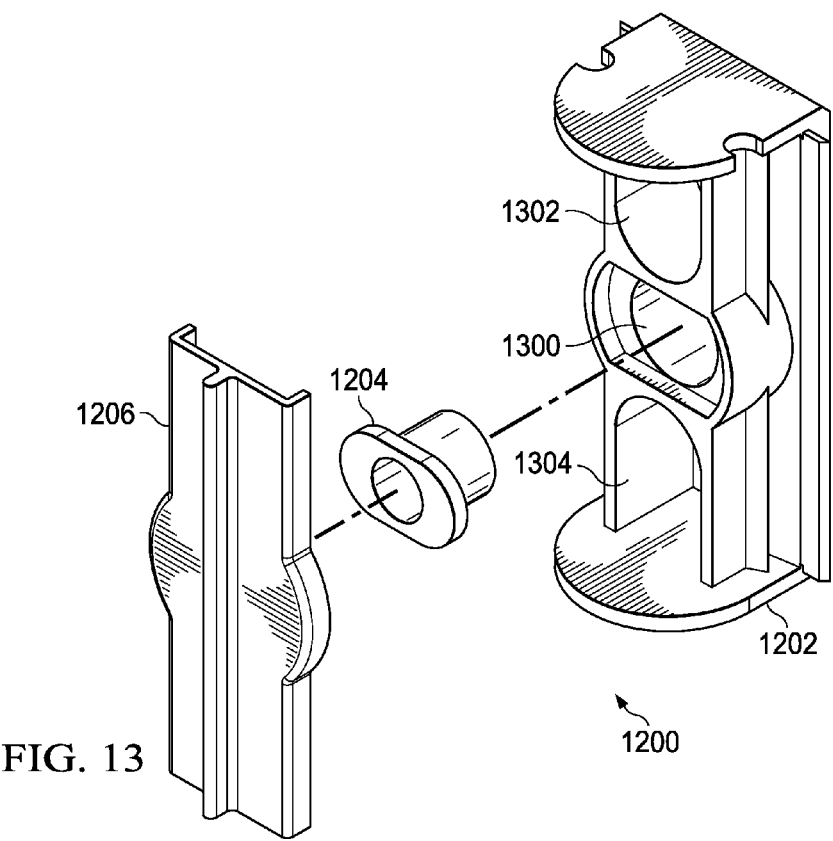
FIG. 13 is an illustration of an exploded isometric view of an insert rotated 180 degrees in accordance with an illustrative embodiment.

With reference now to FIG. 13, an illustration of an exploded isometric view of insert 1200 from FIG. 12 rotated about 180 degrees about axis 226 is depicted in accordance with an illustrative embodiment. In this illustrative example, structure 1202 may be configured to span a composite object (not shown) having a thickness that is greater than the thickness of composite object 200 in FIG. 2.

As depicted, structure 1202 may have hollow fastener chamber 1300. Further, structure 1202 may have hollow chamber 1302 and hollow chamber 1304. Hollow chamber 1302 and hollow chamber 1304 may be longer than hollow chamber 502 and hollow chamber 504 in FIG. 5.

The illustrations of composite object 200 in FIG. 2 and FIGS. 6-9, insert 202 in FIGS. 2-9, insert 1000 in FIGS. 10-11, and insert 1200 in FIGS. 12-13 are not meant to imply physical or architectural limitations to the manner in which an illustrative embodiment may be implemented. Other components in addition to or in place of the ones illustrated may be used. Some components may be optional.

Some of the components in FIGS. 2-13 may be illustrative examples of how components shown in block form in FIG. 1 can be implemented as physical structures. The different components shown in FIGS. 2-13 may be combined with components in FIG. 1, used with components in FIG. 1, or a combination of the two.

Insert 202 in FIGS. 2-9, insert 1000 in FIGS. 10-11, and insert 1200 in FIGS. 12-13 may be installed at the edge of a composite object without reducing the structural integrity of a composite object more than desired. Further, these inserts may be installed at the edge of a composite object quickly and efficiently.

However, in some cases, the illustrative embodiments recognize and take into account that it may be desirable to have an insert that may be installed at the edge of a composite object to function as a retainer for a trim member. The illustrative embodiments recognize and take into account that it may be desirable to have an insert that can be installed at the edge of the composite object quickly and efficiently and without needing to be fully bonded to the edge of the composite object.

Thus, the illustrative embodiments provide an insert that may be used to retain a trim at the edge of a composite object. In one illustrative embodiment, an apparatus comprises a structure and a number of attachment features associated with the structure. The structure is configured to be inserted within a hollow portion of a first object at an edge of the first object. The structure is further configured to span an entire thickness of the first object at the edge of the first object. The number of attachment features is configured for use in attaching a second object to the structure to attach the second object to the edge of the first object.

Figure 14:
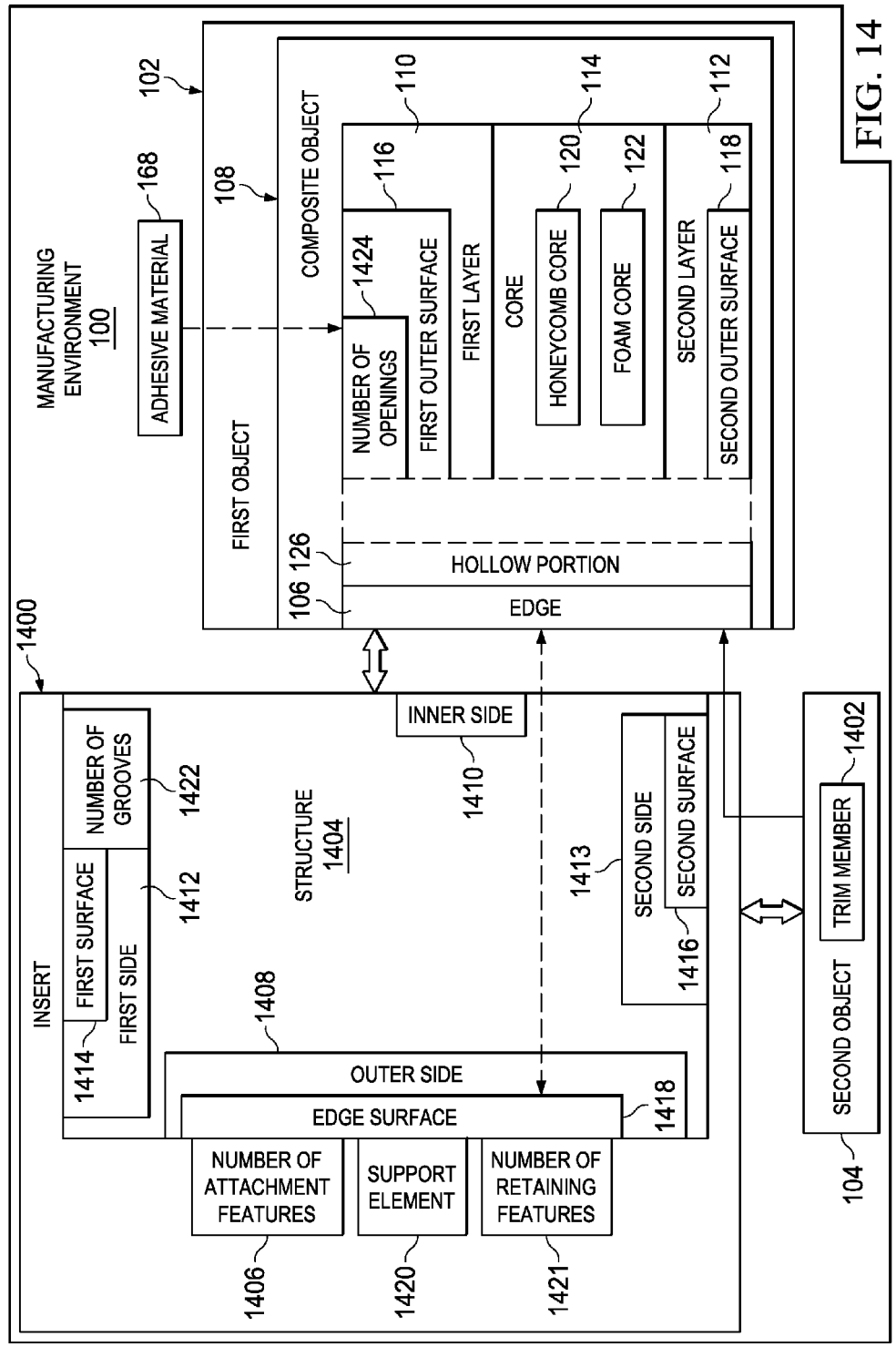
FIG. 14 is an illustration of an insert in the form of a block diagram in accordance with an illustrative embodiment.

With reference now to FIG. 14, an illustration of an insert is depicted in the form of a block diagram in accordance with an illustrative embodiment. In this illustrative example, insert 1400 may be configured for installation at edge 106 of first object 102 from FIG. 1. Insert 1400 may be similar to insert 134 from FIG. 1. However, insert 1400 may not be configured to receive any fastener elements. Rather, insert 1400 may be configured to receive and retain second object 104 without the use of fastener elements.

In this illustrative example, first object 102 may take the form of composite object 108 and second object 104 may take the form of trim member 1402 for composite object 108. Trim member 1402 may be used to cover and protect edge 106 of composite object 108. In particular, trim member 1402 may be used to cover first layer 110, core 114, and/or second layer 112 of composite object 108 exposed at edge 106. Further, when installed at edge 106, trim member 1402 may protect edge 106 such that other objects and/or surfaces may not come into contact with edge 106.

Similar to insert 134 in FIG. 1, insert 1400 may be configured to be positioned within hollow portion 126 of composite object 108 at edge 106. Insert 1400 may be configured such that insert 1400 may be substantially entirely inserted within hollow portion 126.

As depicted, insert 1400 may include structure 1404 and number of attachment features 1406. Number of attachment features 1406 may be associated with structure 1404.

In this illustrative example, structure 1404 may have outer side 1408, inner side 1410, first side 1412, and second side 1413. In particular, structure 1404 may have first surface 1414 and second surface 1416 at first side 1412 and second side 1413, respectively. Structure 1404 may also have edge surface 1418 at outer side 1408. Edge surface 1418 at outer side 1408 of structure 1404 may be the surface of structure 1404 that is exposed at edge 106 of composite object 108 when structure 1404 is inserted within hollow portion 126.

Further, edge surface 1418 may have number of attachment features 1406 that extend from edge surface 1418. However, the other portions of edge surface 1418 may be configured to be substantially even with edge 106 of composite object 108 when structure 1404 is inserted within hollow portion 126. Further, first surface 1414 and second surface 1416 of structure 1404 may be configured to be substantially even with first outer surface 116 and second outer surface 118, respectively, of composite object 108 when structure 1404 is inserted within hollow portion 126.

In other words, edge surface 1418, first surface 1414, and second surface 1416 may be substantially flush with edge 106 of composite object 108 when structure 1404 is inserted within hollow portion 126. In these illustrative examples, structure 1404 may be shaped such that structure 1404, and thereby insert 1400, except for number of attachment features 1406, are substantially flush with all portions of composite object 108 when insert 1400 is positioned within hollow portion 126 of first object 102.

Number of attachment features 1406 may be used to attach trim member 1402 to insert 1400 such that trim member 1402 may be associated with composite object 108. When insert 1400 is positioned within hollow portion 126 of composite object 108, number of attachment features 1406 may be exposed at edge 106 of composite object 108.

In one illustrative examples, number of attachment features 1406 may be configured such that trim member 1402 may be attached to insert 1400 by a "snap-fit." In other words, number of attachment features 1406 may be configured such that trim member 1402 may be able to snap onto insert 1400.

In some illustrative examples, insert 1400 may include number of retaining features 1421. Number of retaining features 1421 may be used to help retain trim member 1402 in a selected position relative to insert 1400 once trim member 1402 has been attached to insert 1400. Depending on the implementation, a retaining feature in number of retaining features 1421 may be implemented at outer side 1408, first side 1412, and/or second side 1413 of insert 1400.

Further, in some cases, insert 1400 may also include support element 1420. Support element 1420 may be configured to extend from edge surface 1418 of structure 1404. Support element 1420 may be used to support trim member 1402 when trim member 1402 is attached to insert 1400 such that trim member 1402 retains a shape of trim member 1402.

Once insert 1400 has been positioned within hollow portion 126, insert 1400 may be adhesively bonded to composite object 108. Insert 1400 may be adhesively bonded to composite object 108 in a manner similar to the manner in which insert 134 from FIG. 1 may be adhesively bonded to composite object 108.

As one illustrative example, structure 1404 may have number of grooves 1422 at first side 1412 of structure 1404. When structure 1404 is inserted within hollow portion 126 of composite object 108, number of grooves 1422 may form number of openings 1424 at first side 1412 of structure 1404.

Number of openings 1424 may open into air pockets that may be around and/or within hollow portion 126 within core 114 around structure 1404. An adhesive material, such as adhesive material 168 from FIG. 1, may be injected into these air pockets through number of openings 1424.

In this illustrative example, any number of inserts implemented in a manner similar to insert 1400 may be installed at edge 106 of composite object 108. These multiple inserts may be used to retain one or more trim members at edge 106 of composite object 108.

The illustration of insert 1400 in FIG. 14 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 15:
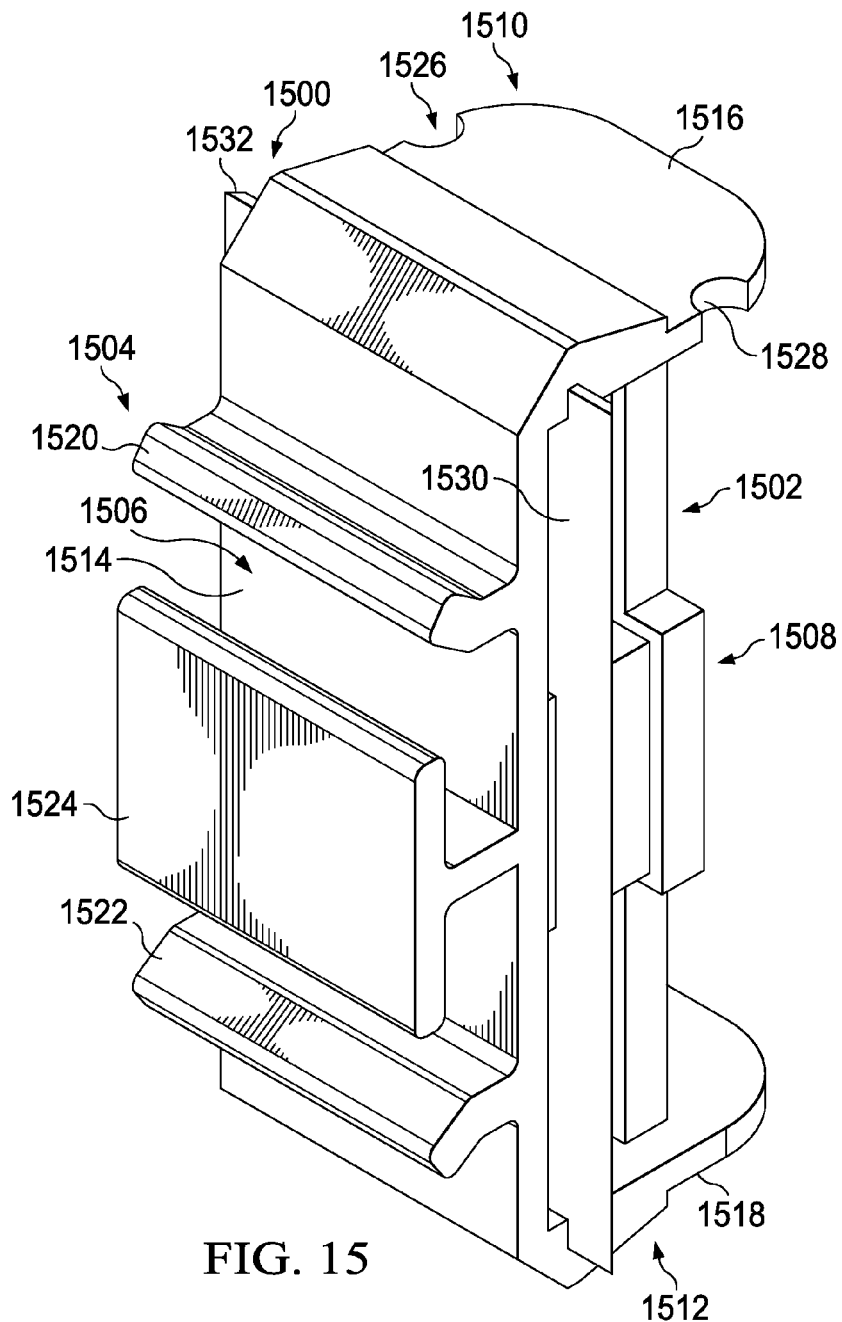
FIG. 15 is an illustration of an isometric view of an insert in accordance with an illustrative embodiment.

With reference now to FIG. 15, an illustration of an isometric view of an insert is depicted in accordance with an illustrative embodiment. In this illustrative example, insert 1500 may be an example of one implementation for insert 1400 in FIG. 14.

As depicted, insert 1500 may include structure 1502 and number of attachment features 1504 associated with structure 1502. Structure 1502 and number of attachment features 1504 may be examples of implementations for structure 1404 and number of attachment features 1406, respectively, in FIG. 14.

In this illustrative example, structure 1502 may have outer side 1506, inner side 1508, first side 1510, and second side 1512. Outer side 1506, inner side 1508, first side 1510, and second side 1512 may be examples of implementations for outer side 1408, inner side 1410, first side 1412, and second side 1413, respectively, in FIG. 14. Further, structure 1502 may have edge surface 1514 at outer side 1506, first surface 1516 at first side 1510, and second surface 1518 at second side 1512. Edge surface 1514, first surface 1516, and second surface 1518 may be examples of implementations for edge surface 1418, first surface 1414, and second surface 1416, respectively, in FIG. 14.

In this illustrative example, number of attachment features 1504 may include first attachment feature 1520 and second attachment feature 1522. First attachment feature 1520 and second attachment feature 1522 may form a snap attachment for use in attaching and retaining a trim member.

Further, as depicted, insert 1500 may also include support element 1524. Support element 1524 may be used to support the trim member that is attached to insert 1500 using number of attachment features 1504. Support element 1524 may help the trim member retain its shape and not buckle. As depicted, insert 1500 may also have groove 1526 and groove 1528. Groove 1526 and groove 1528 may be an example of one implementation for number of grooves 1422 in FIG. 14.

Further, in this illustrative example, structure 1502 may also include a number of flanges that include flange 1530 and flange 1532. In some cases, these flanges may also be referred to as tabs. Flange 1530 and flange 1532 may be flexible at the interface between each of these flanges and structure 1502. In other words, flange 1530 and flange 1532 may be rotated relative to structure 1502 at the corresponding interfaces between flange 1530 and flange 1532.

Flange 1530 and flange 1532 may be configured to hold the adhesive material used to bond insert 1500 to a composite object. In particular, flange 1530 and flange 1532 may be configured to reduce the flow of adhesive material at outer side 1506 of structure 1502 such that the adhesive material does not squeeze outside of and around insert 1500.

Figure 16:
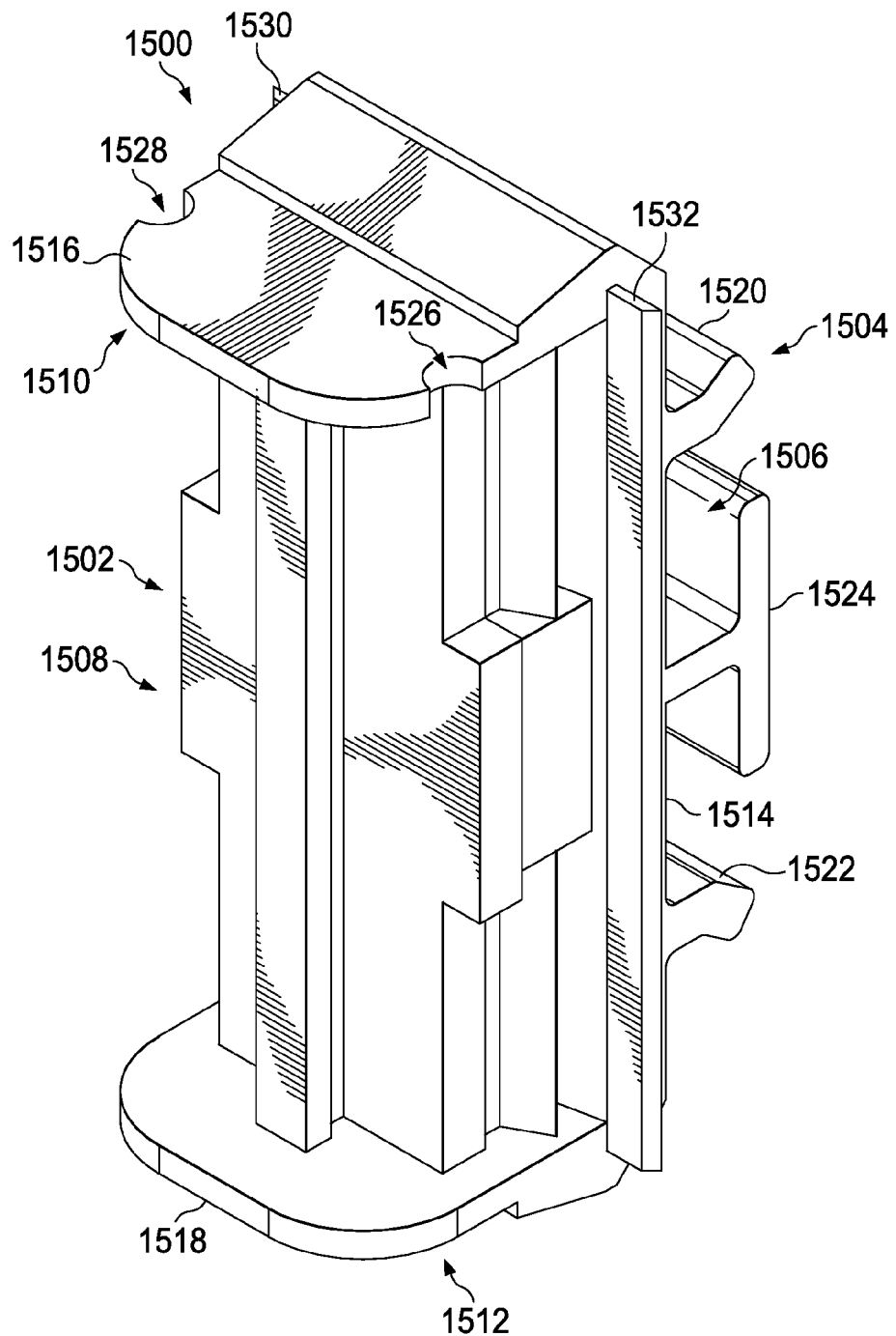
FIG. 16 is an illustration of an opposite isometric view of an insert in accordance with an illustrative embodiment.

With reference now to FIG. 16, an illustration of an opposite isometric view of insert 1500 from FIG. 15 is depicted in accordance with an illustrative embodiment. In this illustrative example, insert 1500 may be viewed from inner side 1508 of insert 1500. As depicted, flange 1532 may be more clearly seen in this view.

Figure 17:
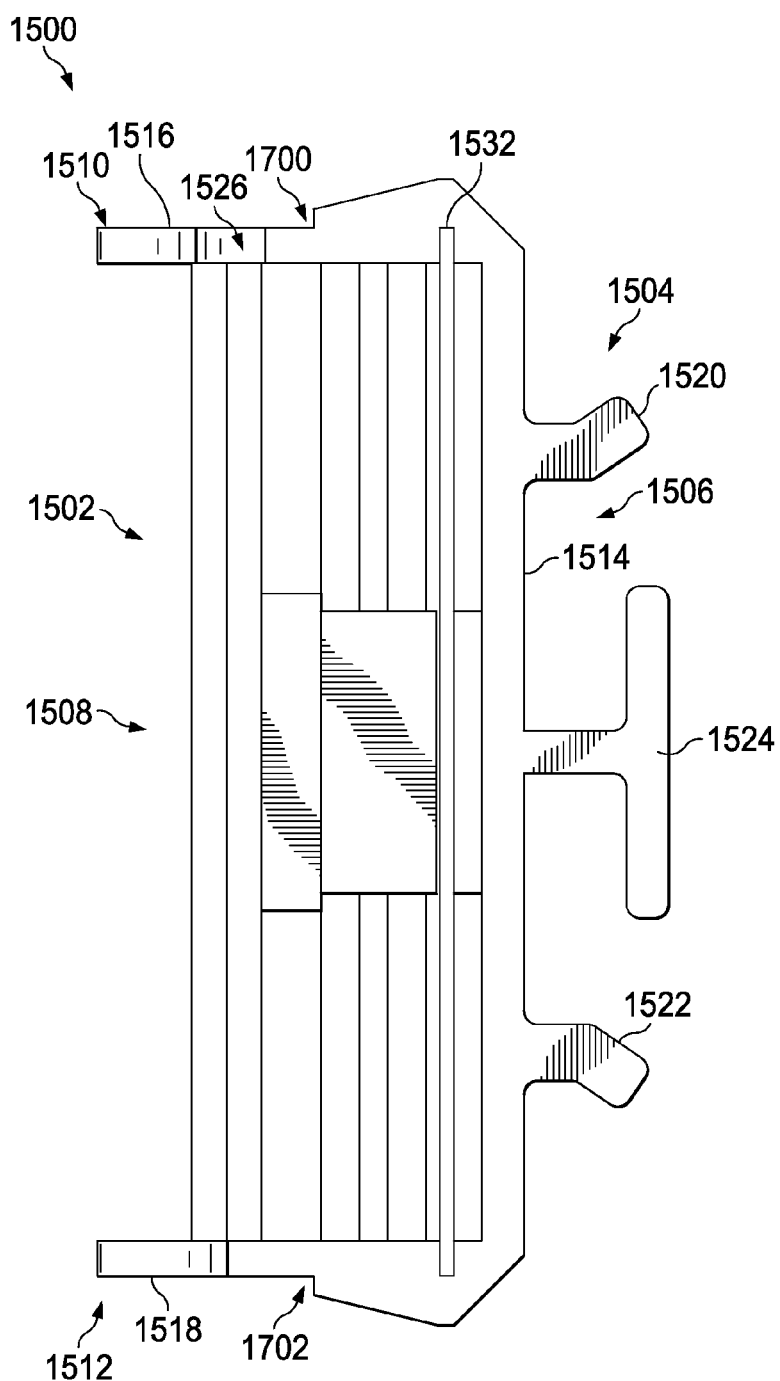
FIG. 17 is an illustration of a side view of an insert in accordance with an illustrative embodiment.

Turning now to FIG. 17, an illustration of a side view of insert 1500 from FIGS. 15-16 is depicted in accordance with an illustrative embodiment. In this illustrative example, retaining feature 1700 and retaining feature 1702 may be seen. Retaining feature 1700 and retaining feature 1702 may be an example of one implementation for number of retaining features 1421 in FIG. 14. As depicted, retaining feature 1700 and retaining feature 1702 may be associated with structure 1502.

Figure 18:
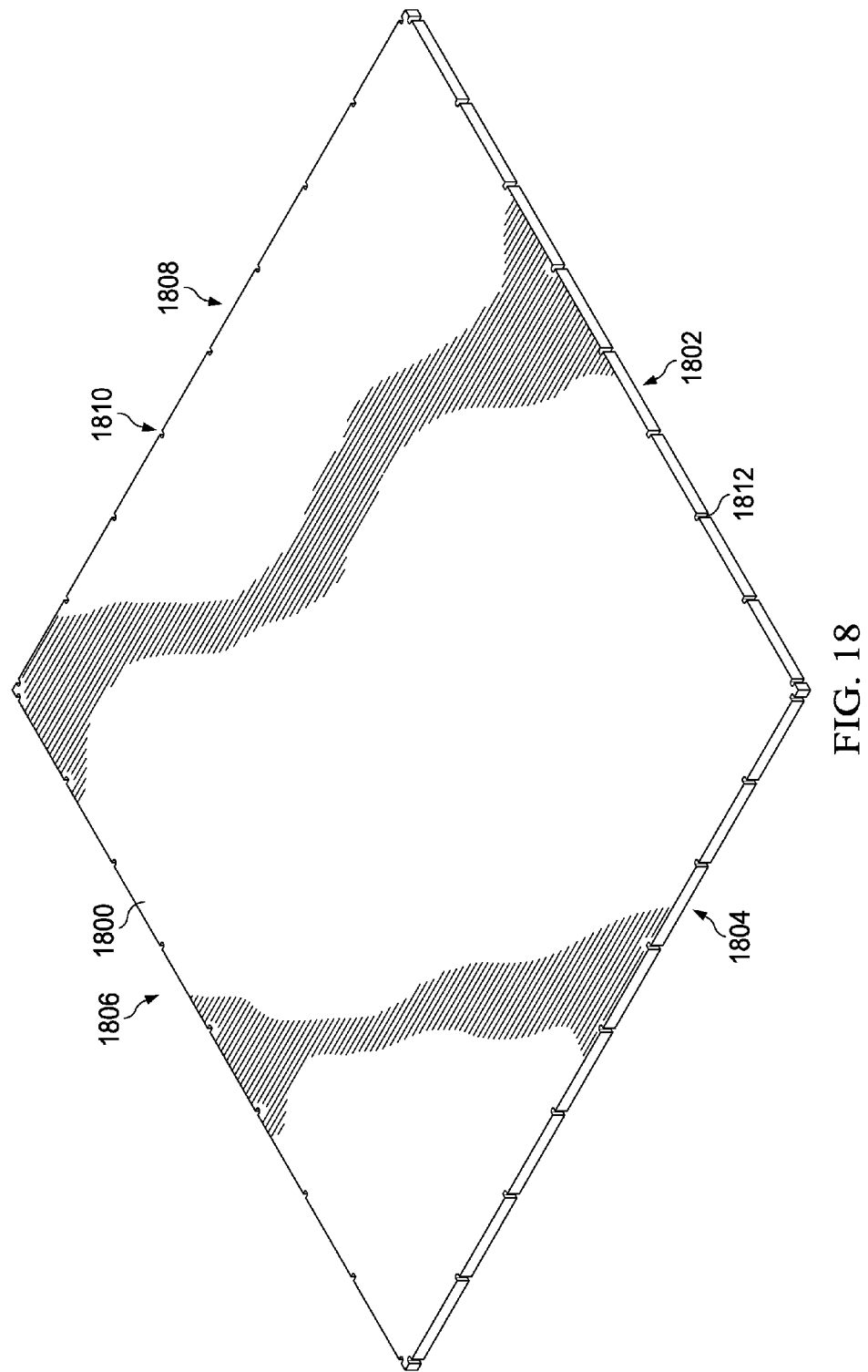
FIG. 18 is an illustration of a composite object in accordance with an illustrative embodiment.

With reference now to FIG. 18, an illustration of a composite object is depicted in accordance with an illustrative embodiment. In this illustrative example, composite object 1800 may be an example of one implementation for composite object 108 in FIG. 14. In this illustrative example, composite object 1800 may have a honeycomb core (not shown) sandwiched between a first layer and a second layer (not shown).

As depicted, composite object 1800 may have edges 1802, 1804, 1806, and 1808. Plurality of hollow portions 1810 have been formed at edges 1802, 1804, 1806, and 1808. As one illustrative example, hollow portion 1812 has been formed at edge 1802 of composite object 1800. Each of plurality of hollow portions 1810 may be configured to receive an insert, such as insert 1500 in FIG. 15, for use in attaching trim members to edges 1802, 1804, 1806, and 1808.

Figure 19:
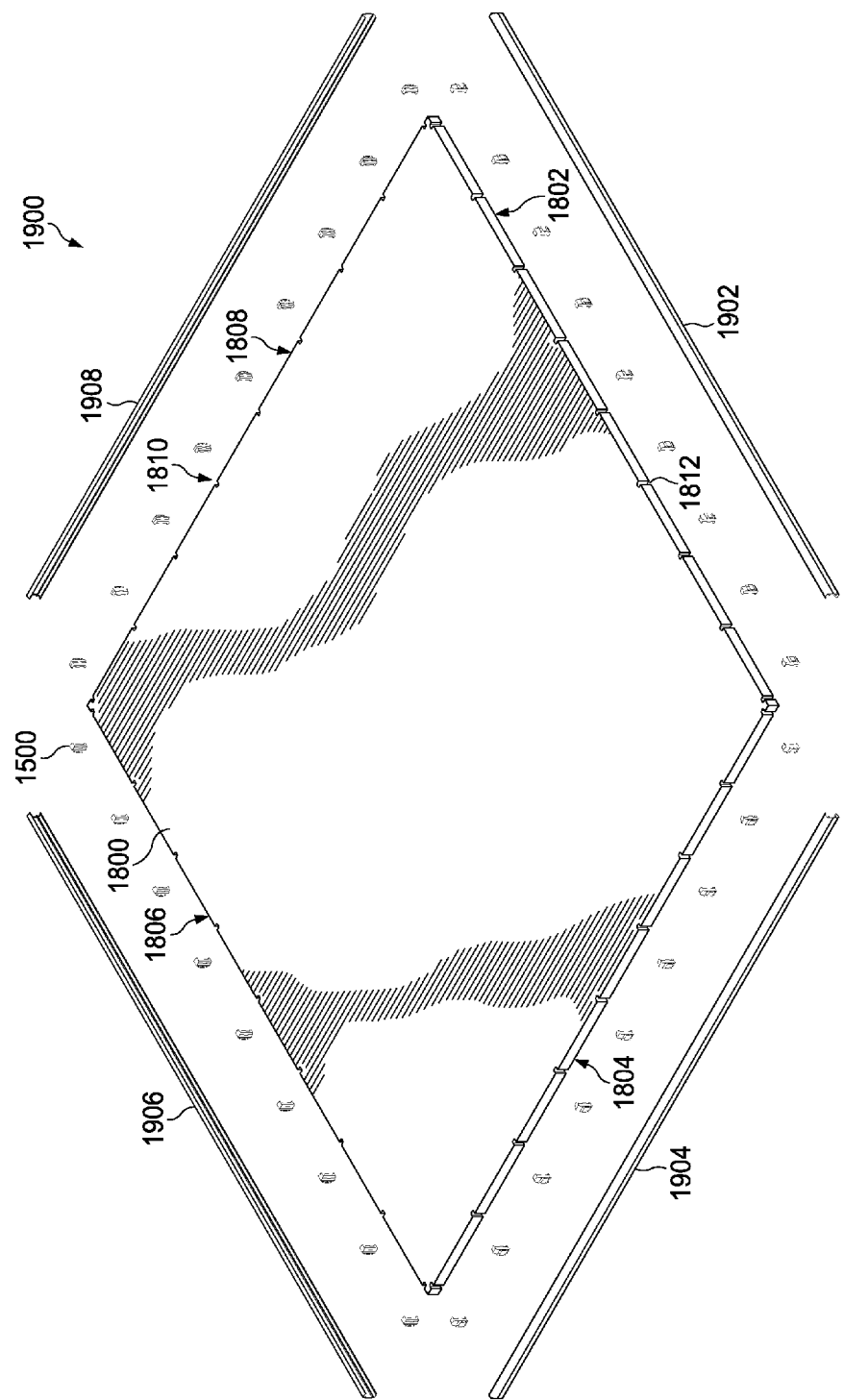
FIG. 19 is an illustration of an exploded view of a trimmed composite object in accordance with an illustrative embodiment.

With reference now to FIG. 19, an illustration of an exploded view of a trimmed composite object is depicted in accordance with an illustrative embodiment. In this illustrative example, plurality of inserts 1900 may be installed in plurality of hollow portions 1810. Plurality of inserts 1900 may be used to install trim members 1902, 1904, 1906, and 1908 at edges 1802, 1804, 1806, and 1808, respectively.

Insert 1500 from FIG. 15 may be part of plurality of inserts 1900. In particular, insert 1500 may be installed within hollow portion 1812 of composite object 1800. Once each of plurality of inserts 1900 has been installed and trim members 1902, 1904, 1906, and 1908 have been attached to composite object 1800, composite object 1800 may be considered a fully trimmed object. Further, each of edges 1802, 1804, 1806, and 1808 may then be considered a trimmed edge of composite object 1800.

Figure 20:
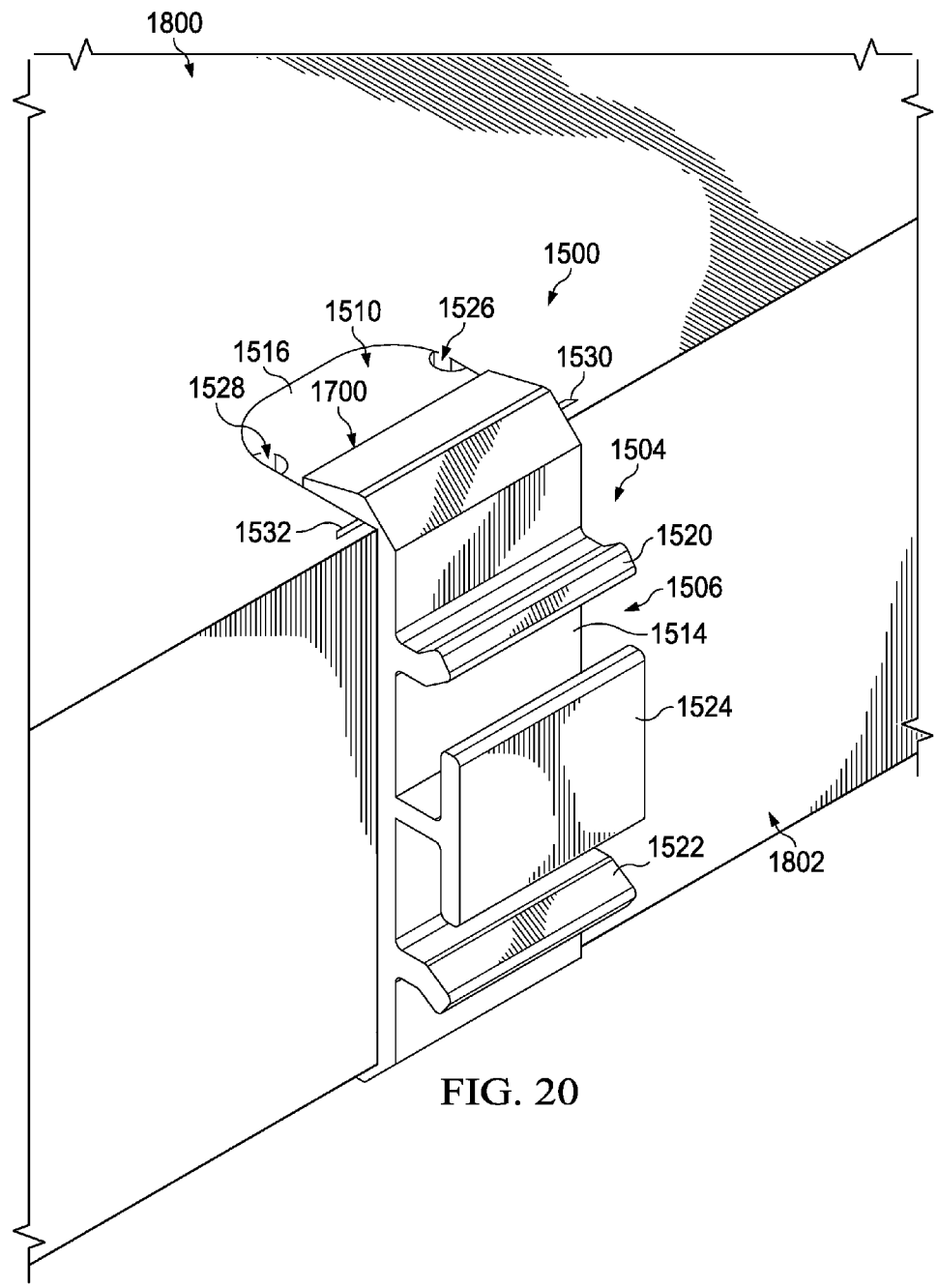
FIG. 20 is an illustration of an enlarged view of an insert installed within a hollow portion of a composite object in accordance with an illustrative embodiment.

With reference now to FIG. 20, an illustration of an enlarged view of insert 1500 installed within hollow portion 1812 of composite object 1800 from FIG. 19 is depicted in accordance with an illustrative embodiment. In this illustrative example, insert 1500 has been installed within hollow portion 1812 (not seen in this view). As depicted, first attachment feature 1520 and second attachment feature 1522 may be used to attach trim member 1902 from FIG. 19 to insert 1500, and thereby edge 1802 of composite object 1800.

Figure 21:
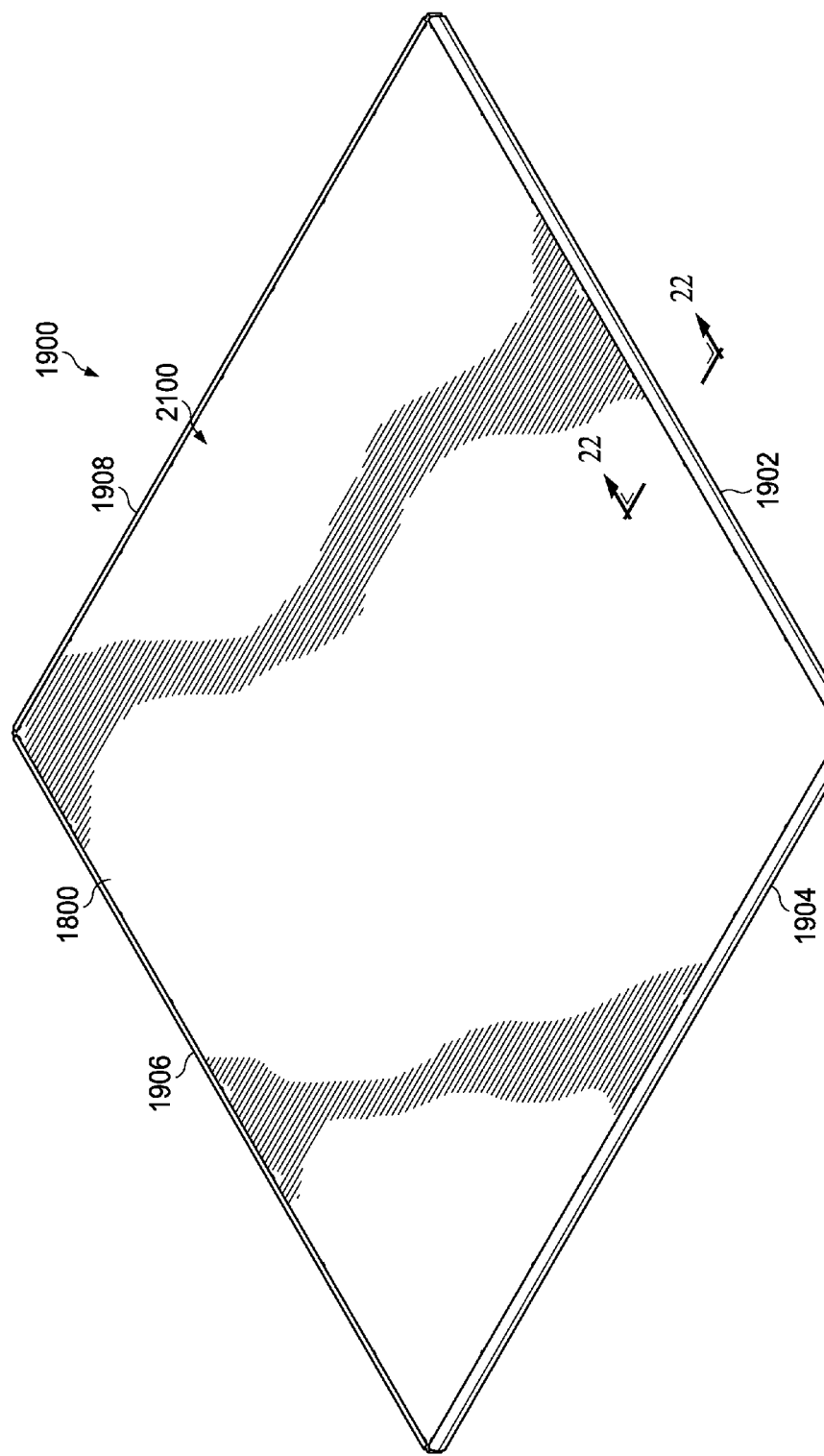
FIG. 21 is an illustration of a fully trimmed composite object in accordance with an illustrative embodiment.

With reference now to FIG. 21, an illustration of a fully trimmed composite object is depicted in accordance with an illustrative embodiment. In this illustrative example, plurality of inserts 1900 have been installed and trim members 1902, 1904, 1906, and 1908 have been attached to plurality of inserts 1900, and thereby composite object 1800. In this manner, fully trimmed composite object 2100 is formed.

Figure 22:
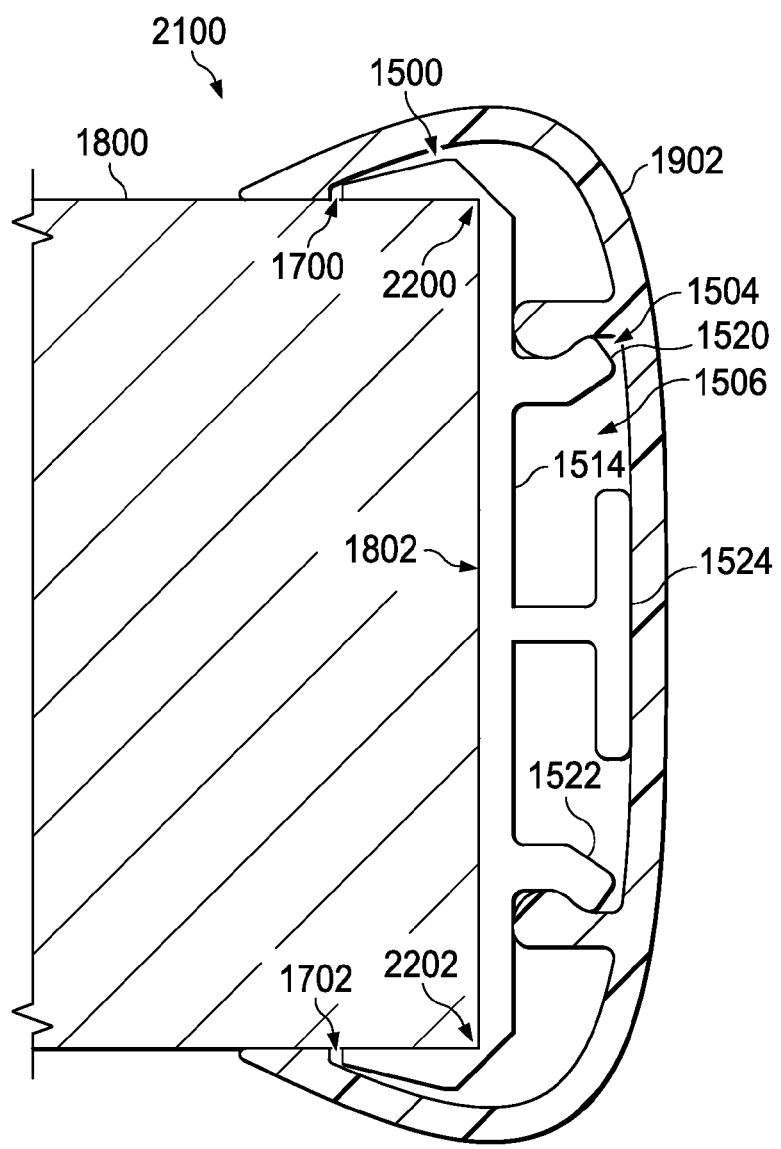
FIG. 22 is an illustration of a cross-sectional view of a fully trimmed composite object in accordance with an illustrative embodiment.

With reference now to FIG. 22, an illustration of a cross-sectional view of fully trimmed composite object 2100 from FIG. 21 is depicted in accordance with an illustrative embodiment. In FIG. 22, a cross-sectional view of fully trimmed composite object 2100 from FIG. 21 is depicted, viewed with respect to lines 22-22 in FIG. 21. As depicted, retaining feature 1700 and retaining feature 1702 may ensure that trim member 1902 remains attached to insert 1500 and composite object 1800. Further, support element 1524 may support trim member 1902 such that trim member 1902 does not buckle inwards towards insert 1500.

In this illustrative example, trim member 1902 may not only cover edge 1802 of composite object 1800 but also protect edge 1802. In particular, trim member 1902 may protect corner 2200 and corner 2202 of edge 1802.

Figure 23:
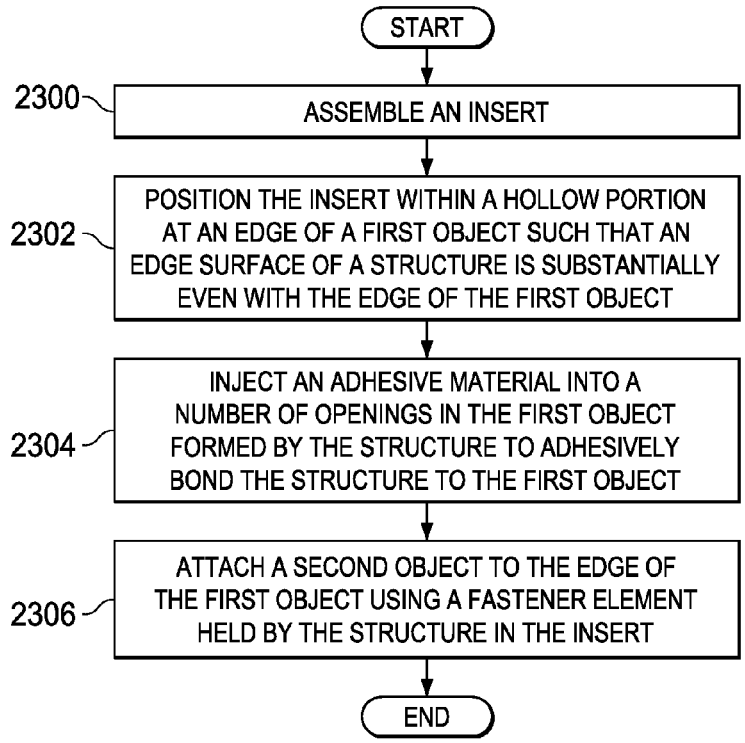
FIG. 23 is an illustration of a process for associating an edge of a first object with a second object in the form of a flowchart in accordance with an illustrative embodiment.

With reference now to FIG. 23, an illustration of a process for associating an edge of a first object with a second object in the form of a flowchart is depicted in accordance with an illustrative embodiment. The process illustrated in FIG. 23 may be implemented to, for example, without limitation, associate first object 102 with second object 104 using insert 134 in FIG. 1.

The process begins by assembling the insert (operation 2300). Operation 2300 may be performed by, for example, without limitation, positioning a fastener element within a hollow fastener chamber of a structure and covering the fastener element and the hollow fastener chamber using a cover. The structure, the fastener element, and the cover may together form the insert.

Thereafter, the insert may be positioned within a hollow portion at the edge of the first object such that an edge surface of the structure is substantially even with the edge of the first object (operation 2302). The hollow portion may span a total thickness of the first object. The structure may have a number of grooves configured to form a number of openings in the first object when the structure is inserted into the hollow portion of the structure.

Next, an adhesive material may be injected into the number of openings in the first object formed by the structure to adhesively bond the structure to the first object (operation 2304). The second object may be attached to the edge of the first object using the fastener element held by the structure in the insert (operation 2306), with the process terminating thereafter. In particular, the fastener element may be configured to receive another fastener element that is configured for association with the second object. In operation 2306, the other fastener element may be installed within a channel extending through the fastener element held by the structure in the insert for use in attaching the second object to the first object.

Figure 24:
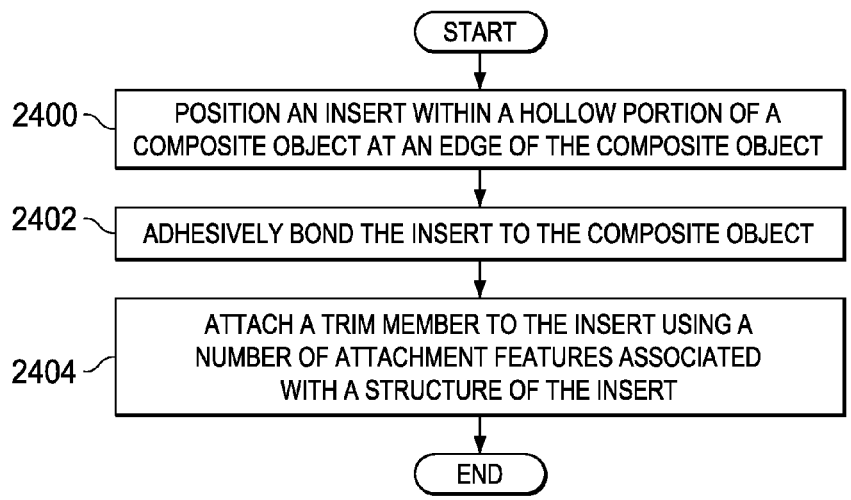
FIG. 24 is another illustration of a process for associating an edge of a first object with a second object in the form of a flowchart in accordance with an illustrative embodiment.

With reference now to FIG. 24, another illustration of a process for associating an edge of a first object with a second object is depicted in the form of a flowchart in accordance with an illustrative embodiment. The process illustrated in FIG. 24 may be implemented to, for example, without limitation, associate an edge of first object 102 with second object 104 using insert 1400 in FIG. 14. In particular, the process may be used to attach trim member 1402 in FIG. 14 to edge 106 of composite object 108 using insert 1400.

The process may begin by positioning an insert within a hollow portion of a composite object at an edge of the composite object (operation 2400). Next, the insert may be adhesively bonded to the composite object (operation 2402).

A trim member may then be attached to the insert using a number of attachment features associated with a structure of the insert (operation 2402), with the process terminating thereafter. In one illustrative example, operation 2402 may be performed by snapping the trim member onto the insert using the number of attachment features.

Illustrative embodiments of the disclosure may be described in the context of aircraft manufacturing and service method 2500 as shown in FIG. 25 and aircraft 2600 as shown in FIG. 26. Turning first to FIG. 25, an illustration of an aircraft manufacturing and service method in the form of a block diagram is depicted in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft in the form of a block diagram is depicted in which an illustrative embodiment may be implemented. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25. Any number of inserts, implemented in a manner similar to insert 134 in FIG. 1, may be used to associate structures with the edges of other structures and, in particular, composite objects. Insert 134 may be configured for use during any one or more of, for example, without limitation, production, component and subassembly manufacturing 2506, system integration 2508, in service 2512, routine maintenance and service 2514, and other stages that may be part of aircraft manufacturing and service method 2500.

In one illustrative example, components or subassemblies produced in component and subassembly manufacturing 2506 in FIG. 25 may be fabricated or manufactured in a manner similar to components or subassemblies produced while aircraft 2600 is in service 2512 in FIG. 25. As yet another example, one or more apparatus embodiments, method embodiments, or a combination thereof may be utilized during production stages, such as component and subassembly manufacturing 2506 and system integration 2508 in FIG. 25. One or more apparatus embodiments, method embodiments, or a combination thereof may be utilized while aircraft 2600 is in service 2512 and/or during maintenance and service 2514 in FIG. 25. The use of a number of the different illustrative embodiments may substantially expedite the assembly of and/or reduce the cost of aircraft 2600.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an object comprising a C-shape, having a first end, a second end, a first inward extension, and a second inward extension;
   a structure comprising an inner side, and an outer side that directly connects to a first side and a second side, such that:
      the outer side comprises an edge surface having an imperforate rectangular shape and a number of attachment features directly connected to and extending from said edge surface and configured to attach said object to the structure; and
      the first side and the second side each extend away, substantially perpendicular, from the outer side, such that:
         the first side, which comprises at least two grooves, connects to the outer side via a first chamfered corner and a first retaining feature where the first surface connects to the outer side, and
         the second side connects to the outer side via a second chamfered corner and a second retaining feature where the second surface connects to the outer side; and
      the inner side of the structure comprises a hollow fastener chamber; and
   a cover shaped to conform around a perimeter of said inner side of the structure, further comprising a planar surface substantially parallel to said edge surface of the structure and a protrusion that extends from said planar surface away from the edge surface.

2. The apparatus of claim 1, wherein the object is a trim member.

3. The apparatus of claim 2, wherein the trim member is configured to attach to the number of attachment features.

4. The apparatus of claim 1, wherein the structure and the number of attachment features form an insert, and the protrusion comprises a length that extends from a surface of the first side to a surface of the second side, such that the surface of the first side faces the second side and the surface of the second side faces the first side, and the length being substantially perpendicular to a central axis of the hollow fastener chamber.

5. The apparatus of claim 1 further comprising:
   the first retaining feature configured to engage the first end of the object and the second retaining feature configured to engage the second end of the object.

6. The apparatus of claim 1, the outer side further comprising:
   a support element that extends away from the edge surface and configured to support the object once the object is attached to the structure.

7. The apparatus of claim 1, wherein the first inward extension and the second inward extension of the object are each configured to form a snap-fit with the number of attachment features.

8. The apparatus of claim 1, further comprising:
   a plate comprising a number of openings that is at least as great as a number of grooves in the first side such that each opening of the number of openings aligns with each groove in the number of grooves.

9. The apparatus of claim 1, further comprising an adhesive bonded to the inner side of the structure such that the adhesive fills a space between the first side and the second side.

10. The apparatus of claim 1 further comprising:
    a number of flanges associated with the structure, each flange rotatably connected to the structure at a respective interface between the flange and the structure and comprising a respective top end that aligns with the first surface, and a respective bottom end that aligns with the second surface.

11. The apparatus of claim 1, wherein the first surface is substantially parallel with the second surface and the cover is positioned between the first side and the second side when the cover connects to the inner side of the structure.

12. An apparatus configured to fit into an edge of a composite object, comprising:
    a trim member comprising a C-shape and having a first inward extension and a second inward extension; a structure which comprises:
       an outer side comprising an edge surface which has an imperforate rectangular shape and a number of attachment features directly connected to and extending from said edge surface and configured to connect to the first inward extension and the second inward extension of said trim member;
       a first side comprising a first surface and first retaining feature and a second side comprising a second surface and a second retaining feature, such that the first surface and the second surface each extend away from, and substantially perpendicular to, the edge surface and the first retaining feature and the second retaining feature each project past said first and second surfaces; and
       an inner side configured to adhesively bond to the edge of the composite object and comprising a hollow fastener chamber; and
    a cover that conforms around a perimeter of the inner side of the structure and in this position, contacts the first side and the second side, further comprising a planar surface substantially parallel to the edge surface and a protrusion that extends from said planar surface away from the edge surface.

13. The apparatus of claim 12, wherein the structure further comprises:
    a support element that extends from the edge surface and is configured to support the trim member once the trim member is attached to the structure; and
    wherein the protrusion comprises a length that extends from an inner surface of the first side to an inner surface of the second side, such that the inner surface of the first side faces the second side and the inner surface of the second side faces the first side.

14. The apparatus of claim 12, wherein the structure further comprises:
    a first chamfered corner connecting the outer side with the first surface and first retaining feature; and
    a second chamfered corner connecting the outer side with the second surface and second retaining feature.

15. The apparatus of claim 14, wherein the trim member further comprises: a first end configured to attach to the first retaining feature, and a second end configured to attach to the second retaining feature.

16. An apparatus comprising an insert, configured to adhere in a hollow portion formed in an edge of a composite object, and a trim member configured to be attached to the insert, such that the insert comprises a structure, a fastener element, and a cover, wherein:
    the structure comprises a first side comprising a first surface, a curved portion, and at least two grooves, a second side comprising a second surface and a curved portion, and an outer side comprising an edge surface with first and second attachment features and a support element wherein:

the edge surface connects directly to the first side via a first chamfered corner that extends over the first surface to form a first retaining feature on the first surface, such that the first side extends, away from the outer side, substantially perpendicular to the edge surface, and the edge surface connects directly to the second side via a second chamfered corner that extends over the second surface to form a second retaining feature on the second surface, such that the second side extends, away from the outer side, substantially perpendicular to the edge surface; and said first and second attachment features extend away from the edge surface, initially perpendicular to said edge surface and then turning away from one another, and said support element extends perpendicular to said edge surface and terminates with a section parallel to said edge surface; and the trim member has a C-shaped form and further comprises:

a first end shaped such that the trim member snaps onto the first retaining feature;

a second end shaped such that the trim member snaps onto the second retaining feature;

a first extension, that extends toward an inner portion of the C-shape, such that the first extension snaps onto the first attachment feature; and a second extension, that extends toward the inner portion of the C-shape, such that the second extension snaps onto the second attachment feature.

17. The apparatus of claim 16, further comprising a first flange and a second flange, each rotatably connected, respectively, along opposing edges of the outer side such that a respective top of each flange aligns with the first surface, and a respective bottom of each flange aligns with the second surface.

18. The apparatus of claim 16, such that the cover comprises a protrusion that comprises a length that extends between an inner surface of the first side of the structure and an inner surface of the second side of the structure, such that the inner surface of the first side faces the second side and the inner surface of the second side faces the first side.

\* \* \* \* \*